INVENTOR
James R. Relyea
BY
John J. McCormack
ATTORNEY

Sept. 19, 1967     J. R. RELYEA     3,342,409

RECORD HANDLING CONTROL SUBSYSTEM

Filed July 28, 1965     10 Sheets-Sheet 2

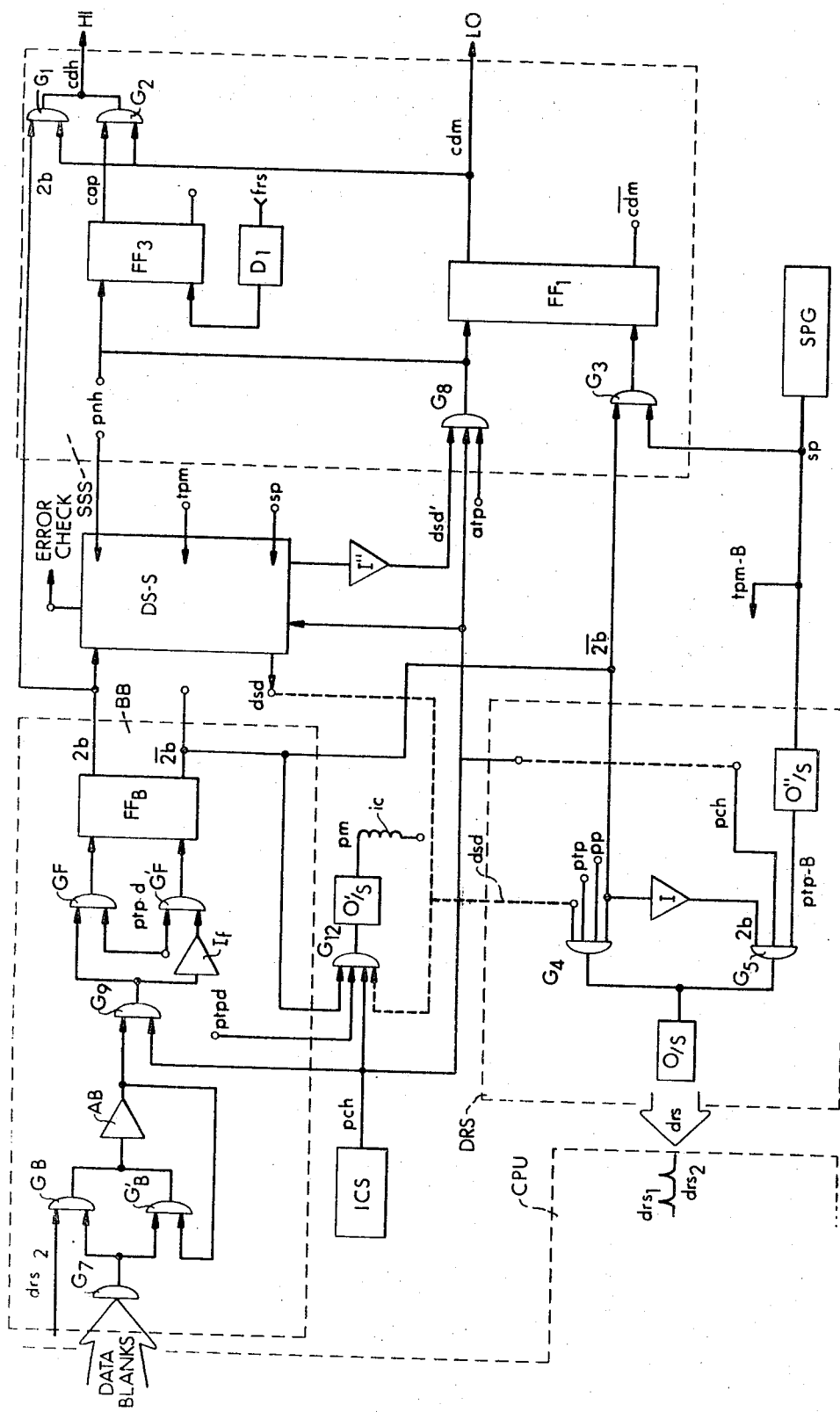

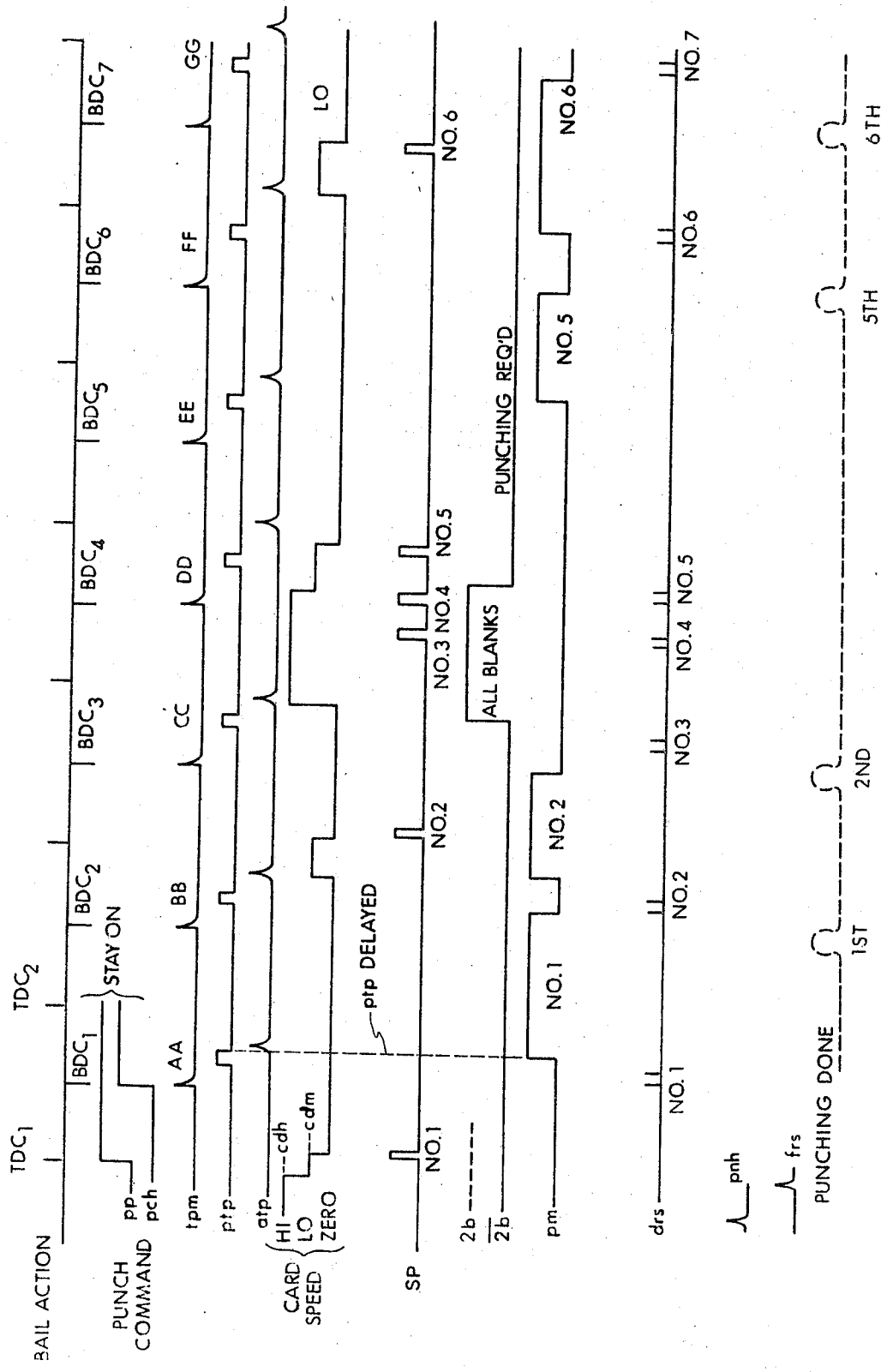

United States Patent Office

3,342,409
Patented Sept. 19, 1967

3,342,409
RECORD HANDLING CONTROL SUBSYSTEM
James R. Relyea, Framingham, Mass., assignor to Honeywell Inc., Minneapolis, Minn., a corporation of Delaware
Filed July 28, 1965, Ser. No. 475,397
18 Claims. (Cl. 234—22)

ABSTRACT OF THE DISCLOSURE

A computer record processing station for record punching or the like and including a processing control unit and an associated record transport and record-tracking monitor, this monitor being adapted to indicate record position relative to the processing station and responsively apply signals to the control unit for coordinating the transport and processing functions, doing so either synchronously with the processing (punch drive) apparatus or asynchronously, simply according to the incremental processing positions of a record.

---

The present invention relates to improved control means for unit record processing arrangements associated with data processing apparatus; and more particularly, is concerned with improved means for controlling record processing means and associated record transport means so that they may be position-responsive and process-mode-responsive; this control means being adapted to interrogate said data processing apparatus and to selectively and responsively control the record speed imparted by said transport means.

Unit records on which data is encoded in the form of position-encoded marks are in common use in data processing systems, for instance, taking the form of the well-known punched cards. Such "marks" are often photo-detectable as in the case of punched holes. The present system relates to means for correlating the location of such marks with the operation of a data processing station and for controlling record-translation means for moving the records through the station. For instance, the system has application as a card strobing means for controlling the column-by-column transport of punched cards through a punching station. Thus, the system provides a strobe tracking, or position-referencing means, for position-monitoring of the translation of unit records.

Workers in the art have shown considerable interest in developing improved record strobing systems and will appreciate the special advantages inherent in a strobing system which tracks the trailing edge of a record. The present system provides such an improved trailing-edge strobing system. Thus, it is a feature of the system to provide an improved record strobing system for correlating the passage of a trailing record-edge with the location of informational zones thereof. It will be recognized by those in the art that such trailing-edge strobing will be superior in many respects to "leading-edge" strobing since it uses a more reliable "reference-edge"; since it is more "fail-safe" in that it turns detectors "on" rather than "off," and since it does not "disable" strobe sensing means upon passage of a record, preventing further use thereof during record-transit time.

One major drawback associated with prior art strobing systems is that "non-informational" record conditions, such as a score, a tear, or a mis-punched hole in a punched card, can, at times, cause a false strobe "read-out." It will be recognized that this is a common problem, since cards are frequently scored to provide detachable portions and since such a score can be mistaken by strobing means arranged to track record edges ("leading" or "trailing") as a reference. Certain prior art systems have been suggested to resolve this difficulty. One such system provides gating detection means in parallel with "reference-edge" strobe detectors for "enabling" the latter only after the "reference-edge" has been distinguishd from similar conditions. Such a system is suggested in copending application, Ser. No. 468,293, entitled "Data Processing Device and Method," filed on June 30, 1965, and assigned in common with this case. The present system provides an improved trailing-edge strobing system wherein such non-informational conditions, such as scoring, are prevented from initiating an accidental strobe indication, this being done without need for any additional detection means. More particularly, the system provides such a system using a minimum of components, as well as avoiding the need for a parallel detection system, particularly by providing an electronic "ordering" arrangement. Thus, it is another feature of the system to provide such a strobing system having improved "score-discrimination" capabilities through use of an electronic ordering arrangement, eliminating the need for parallel gating-detector arrangements.

Related to the above-mentioned problem of score-discrimination is that of reference-edge selection. That is, strobing systems using an edge of a unit record as a reference characteristically encounter the problem of "ragged-edges," such as result from a poor cutting operation, damage to card edges and the like. Thus, it is frequently desirable to provide such a strobing system wherein the detected portions of a reference edge are selectable, according to their condition. The present system provides an improved strobe system having such "reference-selectivity" i.e. wherein strobe reference-edges are made selectable, by providing a unitary detecting arrangement which is position-adjustable and is provided in a simplified mounting structure.

Another object of the system is to provide such a system employing a novel strobe package and associated mounting/alignment arrangement whereby the strobe detector array is adjustably positionable to be aligned along a plurality of strobing axes. Still another object is to provide such a strobing system wherein the photo-detector means are serially arranged to provide strobe detection and wherein score-discrimination is effected by an electronic ordering arrangement which includes alert-detector means together with counting and sequencing means. Still another object is to provide such a strobing arrangement wherein the strobe-detector means are adapted to be gated in an ordered prescribed fashion and wherein the output signals thereof are unitarily amplified and slope-detected.

Strobing arrangements like the above-described find advantageous application as a means for monitoring record position so as to control the intermittent operation of record-transport means, such as for advancing cards steppingly through a punch station. It has been found that such strobe systems according to the present system are rendered particularly accurate, avoiding certain disadvantages associated with other types of position-referencing systems, especially as employed for controlling record-transport. For instance, when a record-transport control is referenced from the condition of transport rollers, shafts or the like, as in the prior art, there is no direct indication of the card position. Thus, slippage between a transport roller and the card will induce an undetected error since roller motion will not correspond to card-motion. Such an error is often cumulative, building up and becoming more severe each time the next card slips as it proceeds through a processing station, so that the position-deviations grow and soon become intolerable. Transport control systems provided with the novel strobe means according to the present system avoid this cumulative error by re-referencing on the card position itself periodically, as each individual card is moved through a station. Such systems can also provide a "position-servo" control over a transport system which can thereby translate records at controllably-variable speeds to controllably-variable positions—something the art has long awaited. Thus, it is another object of the system to provide such a strobing arrangement whereby a continuous monitoring of record position is provided for controlling card transport means via a re-referencing on the positions of a prescribed record portion. It is a more particular object of the system to provide such a strobe arrangement for "position-servo" control of record-transport means. Another object of the system is to provide such a strobe arrangement means for application in "position-to-position monitoring" for positional control of record transport speed through directly responsive velocity record transport means.

The foregoing objects and novel features of the present system are provided together with a preferred embodiment of the invention as described below. This embodiment is an improved record transport control arrangement and comprises ar record processing station for punching card records in a known manner; record stobe means for monitoring the position of card records as they proceed through the station; strobe-responsive record transport means for stepping the cards through the station (between punch positions) and transport control means adapted to modulate transport velocity at prescribed index points (e.g. stopping points) indicated by the strobe means, by punch synchronizing means and the like. More particularly, this strobe means includes a detector array located in prescribed relation to the processing station for position-referencing on the index points by monitoring card position (i.e. the trailing-edge thereof) and applying strobe signals to the control means which includes tracking logic for adapting these strobe signals to apply "stop" signals to the transport means. The transport means includes a drive motor having a non-ferromagnetic rotor coupled directly to card-advancing roller shafts without intervening clutch or brake means for acceleration (torque) control, thus being directly responsive to electrical speed control signals. The control means is adapted to receive these strobe signals as well as punch-data signals and punch-head synchronous signals and responsively apply "Forward" and "Reverse" commands (speed control signals) to the transport means, thus coordinating its operation with card position, punch head phase and data signals. The control means may also selectively synchronize transport operation with punch head operation, desynchronizing them for a "High Speed Skip" under strobe instead. Desynchronizing means are provided to control this selective synchronism.

To provide a multi-speed card-transport for this "skip" mode etc., the drive motor is arranged to have a motor control subsystem with a plurality of speed-select channels coupled in parallel to a summing point and adapted to apply speed-encoded energization signals to the motor. The control means thus includes speed-select means adapted to initiate these energization signals along selected channels. The control means also includes blank-detecting means adapted to detect whether "no-punching" is to be performed at each punch position and responsively control the speed-select means. Data request means are also provided to request punch data signals from an associated central processor being selectively initiatable either synchronously by the punch head or asynchronously by the strobe control.

The strobe means is especially adapted for employment with this transport means and associated control means and functions to conveniently and accurately supply strobe signals. Thus, as punched cards are translated along a prescribed path towards the punch station, they intercept light beams, along prescribed optical paths betwen a light source and successive strobe detectors aligned along this path and responsively generate column-indicating strobe signals. These beams are located in different prescribed relation with said station, so as to indicate the passage of associated card-columns therethrough. Thus, when a particular card-column arrives at "punch-position," a particular portion of the strobe detector array will indicate this to the tracking logic means, and, if stopping is indicated (if any holes are to be punched there), a "stop" signal will be applied to the transport means. According to a novel discriminator, or score-detector, arrangement, the strobe array is also adapted to be energized only when a prescribed (trailing-edge) portion of the record passes. This discriminator arrangement includes electronic ordering means and "alert" detector means for the initiation thereof. An improved detector amplifier means is additionally provided at the output of the strobe detector means also. Further, the strobe-cell aray is so packaged and mounted in a novel mounting arrangement that it may easily be shifted to strobe along various selectable axes, such as along different portions of a card-edge.

The foregoing and other characteristic objects and features of novelty are pointed out with particularity in the claims anexed hereto and form a part of the present specification. For a better understanding of the invention, its advantages and specific objects attained with its use, reference should be had to the accompanying drawings and descriptive matter in which there is illustrated and described a preferred embodiment of the invention.

Referring to the drawings, where like numerals denote like parts;

FIGURE 11 is a block diagram showing details of the control arrangement indicated in FIGURE 7; and FIGURE 12 is a timing diagram for certain elements in FIGURES 7 and 11.

Figure 1:
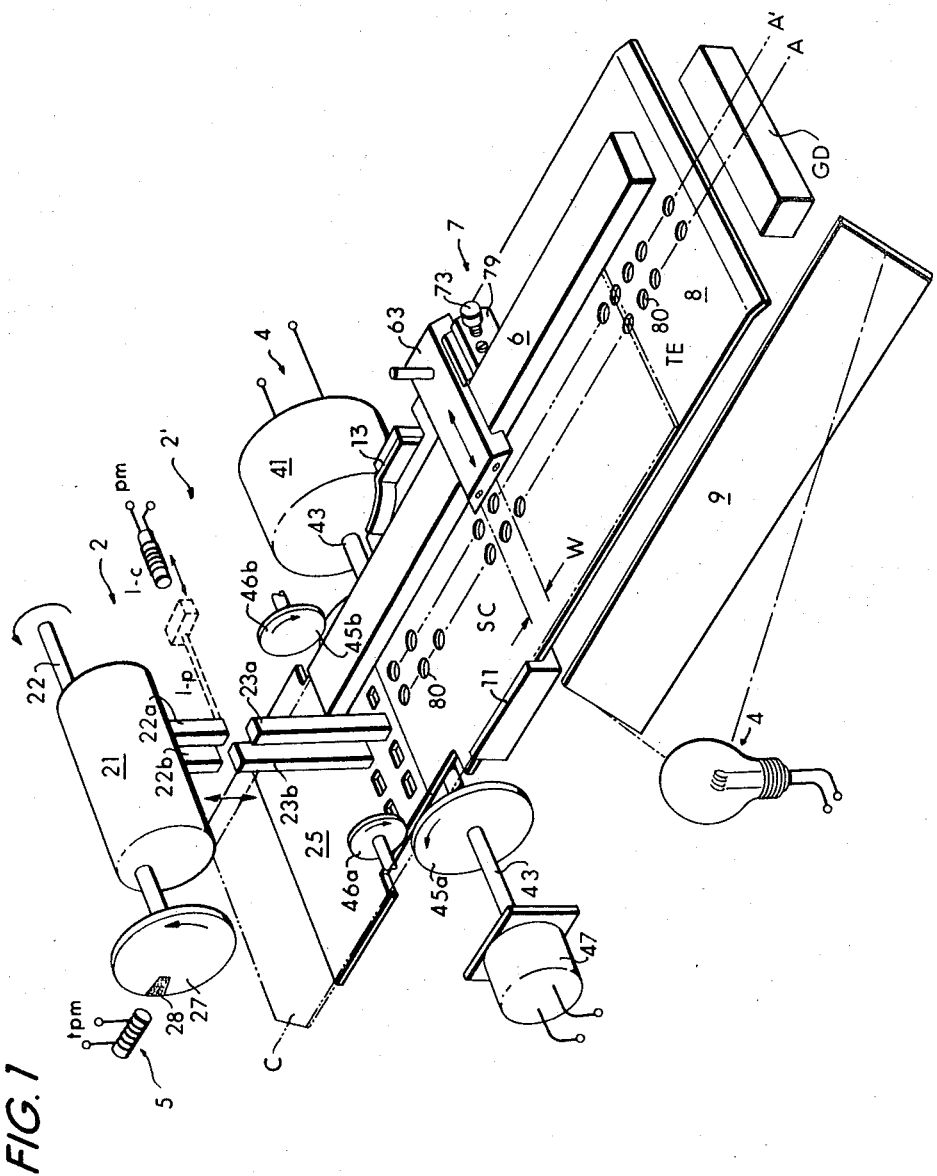
FIGURE 1 is a perspective somewhat idealized view of a preferred application for the invention as employed for use in a processing station including a card punch together with associated transport means and transport control means.

Referring in detail to the figures and especially to FIGURE 1, there is shown a preferred application of the invention in the form of a card punch station for perforating punched cards employed in connection with data processing systems. Functionally, this application represents an arrangement for controllably advancing record media (such as punched card C shown in phantom) with a card transport means 4, past a record processing station, i.e. a card punch head 2. Card punch 2 is adapted to perforate cards C at prescribed data-encoded (column) positions, as known in the art. More particularly, punch 2 preferably comprises a novel arrangement for punching pairs of card-columns simultaneously. Punching is accomplished, as is conventional in the art, by driving, with bail 21 and associated interposers 22, a pair of punch arrays, namely two rows of punch knives $23_a$, $23_b$, each row having twelve knives, i.e. one knife for each row in a card-column. Knife sets $23_a$, $23_b$ are arranged somewhat conventionally to be driven through holes in punch die 25 (across which cards C etc. are stepped by transport means 4) when selectably impacted by associated interposers $22_a$, $22_b$, as known in the art, and to be returned (by means not shown). More particularly, a punch shaft 22 is adapted to be driven rotatingly (by means not shown) so as to reciprocate a supporting punch bail 21 mounted eccentric thereto, as is conventional. Two sets of interposers $22_a$, $22_b$ are pivotably suspended from support bail 21 so as to reciprocate unidirectionally, up and down and to impact ones of associated knife sets $23_a$, $23_b$ when selected by select means 2'. Individual punch knives will be selectively thrust by the driving interposition of an associated interposer 22 which is positioned by punch-select means 2' when select current "pm" is applied thereto. Interposer select means 2' is only very schematically indicated and may comprise any of the well-known means for selectively coupling continuously rotating punch bail means to punch knives. As indicated, select means 2' comprises an array of interposer arms $i$–$p$ (one shown) coupled to each interposer 22 and adapted to thrust the associated interposer 22 into knife-driving engagement when attracted by an associated solenoid $i$–$c$ when the latter is energized by punch-magnet signal "pm."

A punch-monitoring means, namely a reluctance pickup 5 is provided to generate "punch-reference" signals (tpm, below) indicative of the periodic ("home") condition of synchronously operating punch bail 21. Pick-up 5 may be energized conventionally, as by a magnetic (low-reluctance) insert 28 mounted (at "home-position") peripherally in a code disc 27 adapted to rotate with shaft 22. Thus, die 25, shaft 22, support bail 21, select means 2' and the double rows of associated interposers 22 and knives 23 comprise a conventional card punch means 2 for operating upon cards C positioned at the punch station, the station being defined by the holes in punch die 25.

Adjacent the upper surface of die 25 is a strobing platform 8 disposed to be coplanar with die 25 so that, together, they form a continuous, card-supporting surface across which cards C etc. may be transported by advance means 4. Advance means 4 includes two pairs of rollers 46, 45, namely cooperating upper and lower rollers 46A, 45A (left) and 46B, 45B (right), respectively. One of the rollers in each pair is drivenly mounted on a transport drive shaft 43, which is adapted to be selectively, controllably rotated by a "variable-velocity," "field-coupled" drive means, namely transport motor 41. As seen below, drive shaft 43 also carries a velocity-sensing means, such as a tachometer 47 affixed thereon for sensing the rotational velocity thereof so as to control associated transport motor 41 as indicated hereinafter.

As seen below, it is a feature of this application that transport motor 41 is arranged to be directly and proportionally torque-responsive to electrical control signals whereby, according to the level and polarity of speed-control signals the drive shaft 43 for transport rollers 45, 46 may be rotated at prescribed speeds and in a prescribed direction without the intervention of clutch or brake means. Such a motor is the non-ferromagnetic rotor (air core) type, having practically no magnetizable metal in the rotor and arranged to be rotated through the (shifting) path of driving stator flux, rather than completing the flux path. Such a motor is constructed to exhibit a high torque/inertia ratio and thus may be directly responsive to velocity-control signals for "demand" transport control. That is, it may be directly acceleratable (inductively coupled only), dispensing with clutches, and to be directly deceleratable, eliminating brake means. Braking is effected simply by rotor field reversal. This, in turn, eliminates the need for actuators for clutches and brakes and friction losses therefrom. It also allows a continuous "analog" control of torque output rather than the usually incremental step control of clutch couplings.

Such a low inertia in "field-coupled" transport drive train is adapted to be directly responsive to strobing arrangement 6 through associated control means to provide a position-referenced transport system having constant accurate and invariant response. Of course, a drive means with high inertia and relatively slow response is impractical for such use and inapt for tracking control and speed/position referencing. Tachometer 47 provides a means for adjustably-controlling velocity (including "zero-velocity" or "stop" mode) according to the amount of velocity-indicating voltage generated thereby and applied to control the energization of motor 41. Motor 41 thus provides a directly strobe-responsive drive means for advancing records and is especially adapted for position-referenced control using the improved strobe means according to this application. Thus, drive motor 41, shaft 43, rollers 45, 46 and tachometer 47 comprise a position-referable record transport means 4 adapted to drive punched card records C etc. through the punch positions defined by die 25, doing so in a controlled manner as indicated hereinafter. Cooperating with this transport system are card-alignment means, namely a guide rail 11 and a cooperating flexure spring 13 for urging cards thereagainst into alignment so that holes 80, 80' in plate 8 fall between informational card-rows, providing alignment both with punch means 2 and with strobe package 6.

It will be observed that strobe platform 8 is apertured in a prescribed manner, having two rows of strobe apertures 80, 80' along parallel strobe axes A, A' respectively, in prescribed relation with strobe detector package 6. Strobe axes A, A' are chosen so that apertures 80, 80' will not register with any part of the informational (hole) areas of punched cards C, etc. as they are transported, aligned, across plate 8, but will fall along prescribed inter-row strips. Apertures 80, 80' are also spaced apart along axes A, A' by two-column-distances, preferably, so as to be overshadowed by trailing-edge TE portions of cards C etc. (having a prescribed length) when different prescribed "punch-zones" (i.e. column-pairs) arrive in "punch-position" at punch die 25. Platform 8 is illuminated from below by relatively normally-incident light from a lamp 9 and mirror 9'. Thus, apertures 80, 80' may begin to direct light beams upon associated strobe detector cells in strobe package 6 when trailing-edge TE assumes different prescribed "reference-positions," corresponding to the arrival of different card columns at die 25 and the exposure of associated beams. A gating detector GD is provided upstream of strobe package 6 as schematically indicated and is adapted to enable the strobe detectors in a prescribed manner as described below. Strobe platform 8 is detachably mounted upon a position of the fixed frame (not shown), being attached thereto for adjustable positioning along axes A, A' such as by clamp bolts in an aligning slot. Since platform 8 carries strobe clamp 7 and strobe package 6 thereon, this adjustability provides a coarse alignment of strobe detectors as will be seen.

Platform 8 carries strobe package 6 and optically coacts therewith. Strobe package 6 comprises photodetector means mounted, to be adjustably positioned and selectively alignable along either of strobe axes A, A', so as to detect illumination through either row of apertures 80, 80'. As indicated, strobe positioning clamp 7 is mounted upon platform 8 so as to suspend strobe detector package 6 thereabove at a prescribed record-admitting height and in three-dimensional alignment along a selectable one of strobe axes A, A'. Clamp 7 functionally constitutes an adjustable positioning means adapted to selectably position (laterally) and to align the detector means in strobe package 6 to be in optical registry with light beams through either row of apertures 80, 80' for energization thereby as they are successively exposed by passing cards C etc. Strobe package 6 is rigidly affixed at the end of a clamp bar 63' which is received slidingly in a socket portion 79 of clamp 7, being held with a locking clamp-screw 73, as described below.

As will become more apparent, it is a feature of this application that the strobing arrangement in package 6 may thus generate stroke signals which indicate the transit of successive column-areas of card C across punched die 25, asynchronously and directly without reference to transport elements. It will further be apparent that such strobe signals can be arranged to control transport drive motor (41) and thus control the stepping translation of cards C past punch head 2. For instance, strobe package 6 can be arranged to control motor 41 to be decelerated at prescribed times causing card C to stop at any prescribed column-position under punch 2. This arrangement may further be used in combination with a "motor-start-signal" generating means, such as reluctance pick-up 5, synchronized to punch 2, to provide a "position-to-position," "stop/start," control of transport means 4. Such a control may be directly referenced to the position of the card C for "stop" control and referenced to punch 2 for "start" and punching controls. According to another application feature, a high speed skip transport mode may be provided during which punch-head synchronism is superceded by strobe signals which also provide a "look-ahead" command-interrogation mode therewith.

*Strobe package*

Figure 2:
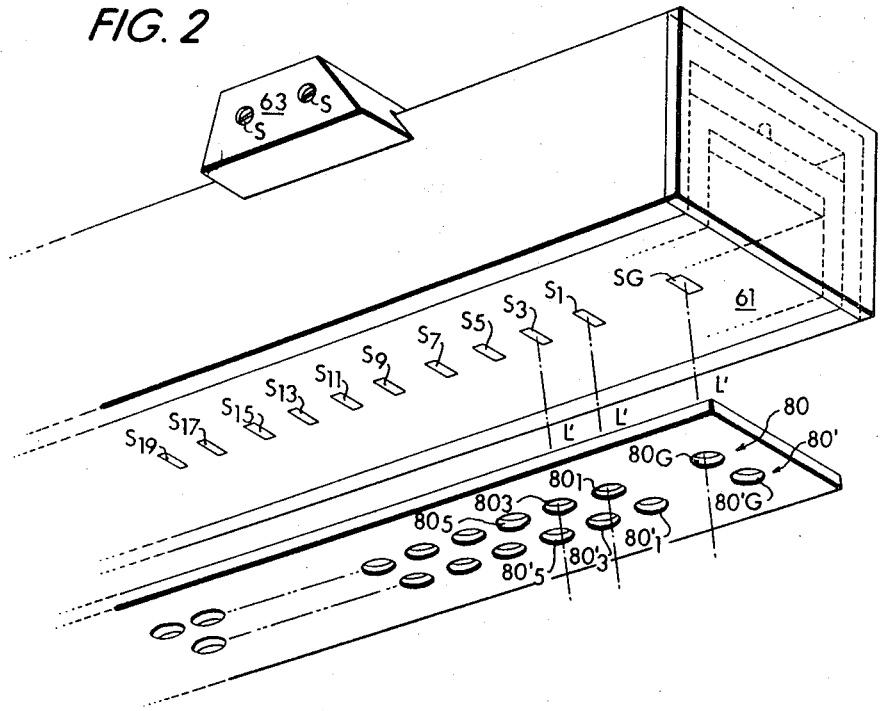
FIGURE 2 is an enlarged, bottom view of an end portion of the strobe means indicated in FIGURE 1.
Figure 3:
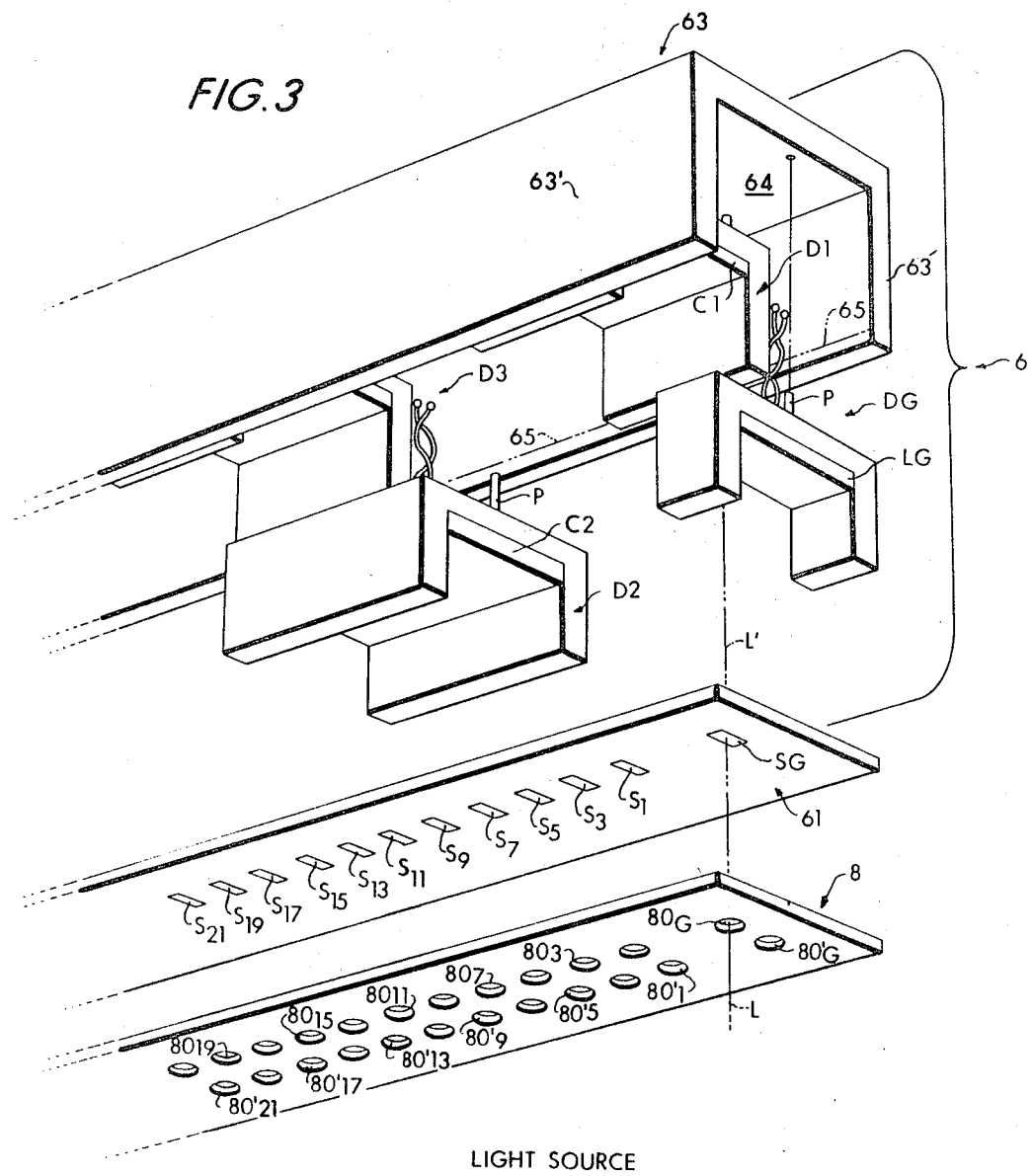
FIGURE 3 is an exploded view of the strobe means in FIGURE 2 showing the strobe mask and detectors exploded away.
Figure 4:
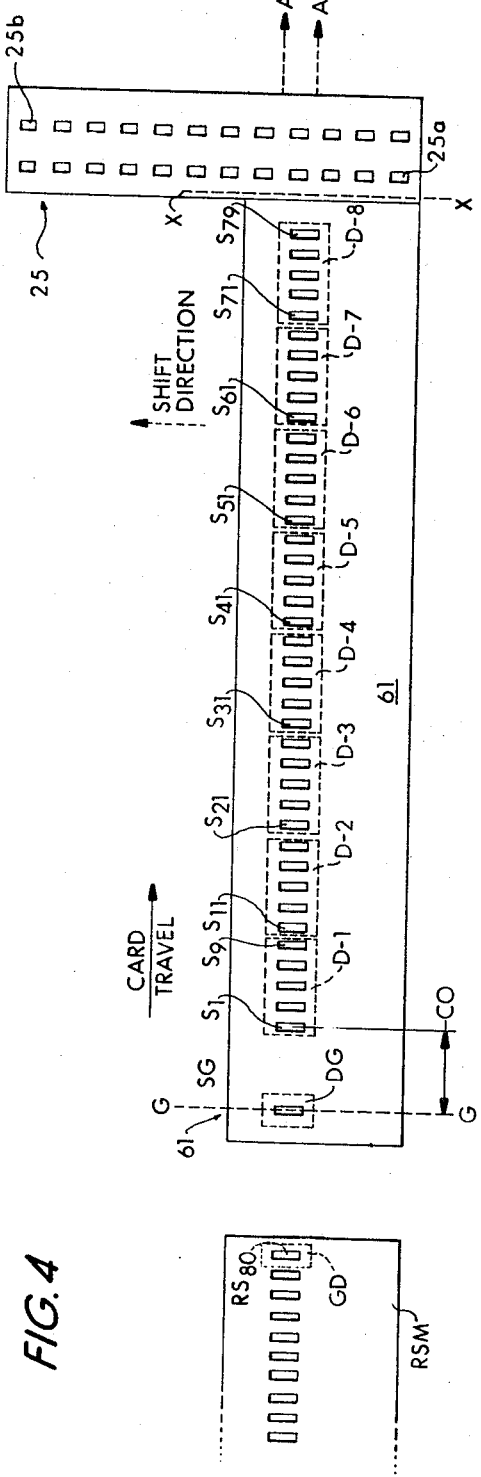
FIGURE 4 is a plan view of the strobe mask in FIGURES 1, 2 and 3 and adjacent punch die means and alert detector means.

The general organization of the arrangement indicated above relative to FIGURE 1 will be better understood with reference to FIGURES 2, 3 and 4 which more particularly illustrate the structural features of the strobing arrangement 6 and related elements. Strobing arrangement 6 includes an aligned linear array of detector means D (D1, D2, DG, etc.), mounted within a base 63 to be in optical registry with prescribed associated ones of a plurality of strobe slits S1–S80 through an opaque strobe mask 61 which is otherwise opaque to provide a light-tight cover on base 63. Additionally, an optional gating means is indicated comprising a slit SG in mask 61 and a gate detector DG optically associated and in registry therewith. Each detector block DG, D1 etc. includes a photo-voltaic strip cell LG, C1 etc. and electrical connector means therefor, together with positioning pin means P. Functionally, strobe slits $S_1$ etc. are, when mounted upon strobe mount 7, arranged to be spaced at prescribed, different distances from punch die 25, these distances corresponding to the position of trailing-edge TE of cards C when an associated column (or pair of columns) thereof is positioned for punching at the "punch-position." Thus, strobe arrangement 6 tracks the trailing-card edge TE to thereby detect the arrival thereof at "reference positions" corresponding to the registration of associated different card-columns at punch 2. Adjustable means in strobe plate 8, allow slight adjustment of the spacing of strobe arrangement 6 from die 25.

Thus, in the arrangement shown, the mask 61 includes a gating slit SG and 40 strobe slits ($S_1$ through $S_{79}$—one for the initial card-column of each pair in an 80-column-card). These are fragmentarily indicated in FIGURE 3 (view from bottom) and function to successively sense the advancement of the trailing card edge TE between "punch-positions." Therefore, slits S1 etc. are located in alignment along mask 61 so that when strobe arrangement 6 is positioned in clamp 7 to be pre-aligned along a selected strobing axis (shown along axis A, mask 61 abutting with die 25), each of the forty slits, S1 through S79, will be located a prescribed distance from die 25. For reasons later explained, each strobe detector is arranged to be energized by five slits. Thus, eight detector blocks D1–D8 are provided, for instance, detector D1 being positioned so that cell C1 thereof may be energized by slits $S_1$, $S_3$, $S_5$, $S_7$ and $S_9$.

Upon the passage of edge TE, each strobe slit will admit light from lamp 9 through an associated hole 80 to charge a related cell when the associated card-column assumes "punch-position." Specifically, when the trailing-card edge TE uncovers initial slit $S_1$, then column 1 thereof will be located at die 25 for punching, this being indicated by the incidence of light on a portion of cell C1 and the subsequent emission of an "$S_1$" strobe signal. Similarly, when trailing-edge TE passes over the final strobe slit $S_{79}$, then column 79 of card C will likewise be located at die 25, cell C8 of detector block D8 indicating this so that holes may be punched by knives $23_a$, $23_b$ in indicated rows of card-columns 79, 80. It will be understood that die plate 25 comprises two identical parallel rows of twelve die holes $25_a$, $25_b$, each hole thereof being spaced to register with one of the row-positions of a punched card C when the card is superposed thereon, after having been aligned against guide-rail 11.

While other means may be used (as indicated below relative to FIGURE 8), a starting or "alert" means has been indicated in the form of a gate-detector DG, energized by an associated gate slit SG in mask 61. Gate slit SG is located a prescribed distance upstream of strobe slit array S1 through S79 and aligned therewith being spaced a prescribed distance CO from gate-axis G—G to initial slit $S_1$. CO is kept at a minimum according to this system though a suitable delay can vary this. The uncovering of alert slit SG and energization of its associated cell LG (housed in detector block DG) will serve to initiate the electronic ordering system associated with strobe cells C1 through C8 and provide a means of discriminating against accidental perforations (scores) which might otherwise prematurely trip the strobe detectors. This location along strobe axis A (FIGURE 4) and electronic control will assure that the strobe slits $S_1$–$S_9$ associated with detector D1, for instance, will not emit strobing signals unless alert cell CG is energized simultaneously therewith. Stated otherwise, this gating (or alert) arrangement prevents a score SC (FIGURE 1) which is less than a maximum width W (i.e. not wider than distance CO) from tripping any of the strobe cells. It is thus a feature of this system that score-discrimination is simply provided. Other "alert means" may serve this same purpose however; one such being indicated relative to FIGURE 8.

Another feature of this application is that a conservation of detector cells C1 through C8 is achieved without sacrificing accuracy and reliability of detection. This is implemented according to an arrangement of modular, removable detector blocks that are easily inserted or replaced within strobe package 6, each block including one photo-voltaic cell strip C1 etc. for detecting energization through a plurality of strobe slits according to a stepped output therefrom. While only five strobe slits S1 etc. are indicated as energized detector cells C1 etc. it has been found that any number of slits up to about 10 may be used satisfactorily. Another advantage of this arrangement is that imperfections in, or failure of, small areas of the detector material are less expensive to repair when only a portion of a detector must be replaced. That is, it would be more expensive to replace the entire cell length S1 through S79 if this length were not broken up into modules which are individually removable. It will be apparent that since strobe slits S1 through S79 must not be energized by the informational data-holes in the punched cards C etc. that they must, therefore, be locatable along a strobe axis (A, A') between card-row locations by clamps 7 when the cards are aligned along guide-rail 11.

Figure 5:
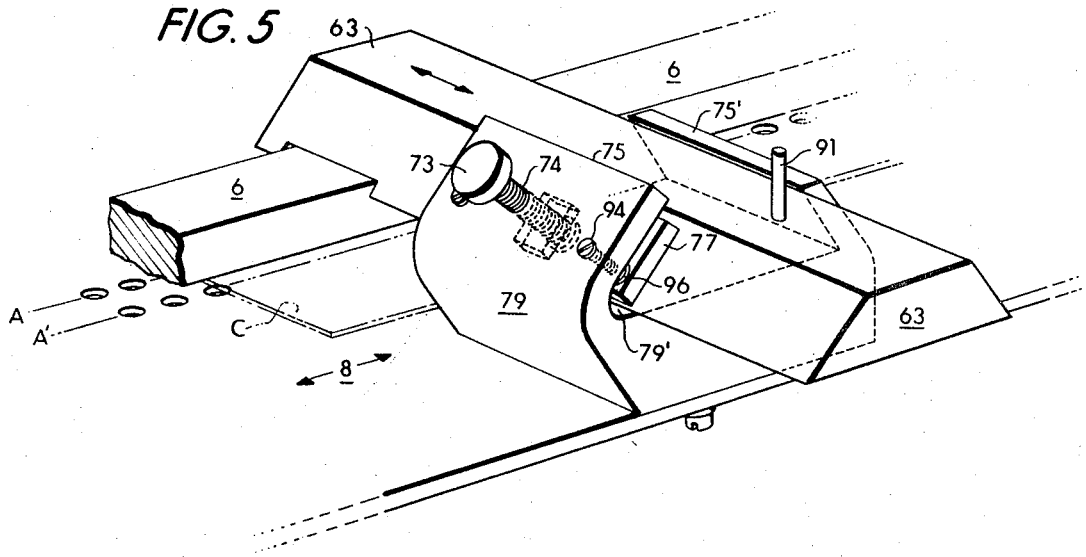
FIGURE 5 is an enlarged perspective view of the strobe positioning means in FIGURE 1.
Figure 6:
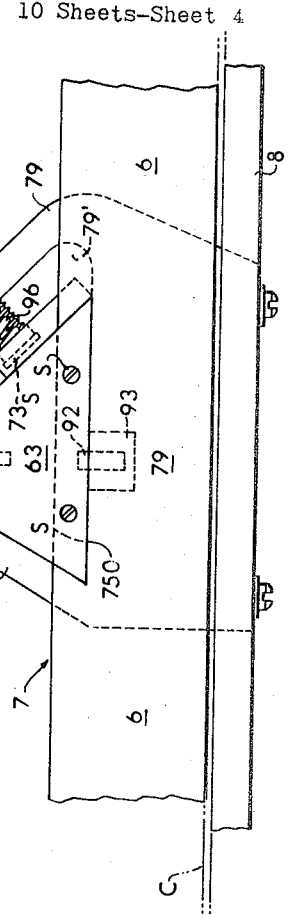
FIGURE 6 is an end view in elevation of the arrangement in FIGURE 5.

FIGURES 5 and 6 illustrate the details of positioning clamp 7, functionally indicated above, as accommodating the inter-card-row alignment of strobe slits $S_1$, $S_3$ etc. As noted, clamp 7 is adapted to permit strobe package 6 to be selectively aligned along different strobe axes A, A' allowing an attendant to choose an inter-row portion of trailing card-edge TE which is in optimum condition (not ragged etc.). Thus, a mounting arm 63 is provided being attached to package 6 and mounted in clamp 7 to suspend strobe 6 along prescribed strobe axes A, A'.

More particularly, clamp 7 includes a base 79 rigidly affixed to arm 63. Base 79 includes a pair of opposed sidewall portions 75, 75', defining a slot 750 therebetween. Slot 750 corresponds to the cross-sectional outline of strobe arm 63 to accommodate sliding adjustment between strobe axes A, A' and having a stop (or positioning) pin 92 adapted to engage opposite ends of a stop slot 93 in the bottom 79' of slot 750. Slot 750 formed by inwardly canted sidewalls 75, 75' of clamp base 79, will thus be arranged to have a width sufficiently larger than that of strobe arm 63 to accommodate insertion thereof and a bottom 79', sufficiently long to accommodate translation of positioning pin 92 between positions fixing strobe 6 aligned along strobe axes A and A'. Base 79 is, of course, mounted rigidly from the strobe platform 8. It will be noted that a clamp bar 77 is provided to engage arm 63, being engaged at cavity $73_s$ thereof by an enlarged head portion at the inner end of adjustment bolt 73. Bolt 73 is threadably mounted in one of sidewalls 75, preferably at an angle so as to engage bar 77 against a canted side of arm 63 and to thrust the opposite side thereof matingly against the opposite inner surface wall of the opposite sidewall 75'. A pair of aligning spring-set lock bolts 94 are provided to abut adjustably against bar 77 to align strobe 6 laterally along strobe axes A, A'. Thus, the strobe package 6 is adjustably positionable relative to strobe axes A, A' by clamp 7, being axis-selectable with screw 73 and laterally alignable with lock bolts 94. Leveling springs 96 surround lock bolts 94. It will be evident that clamp 7 may position strobe slits $S_1$–$S_{79}$ in prescribed relation with the punch station defined by die plate 25 as shown in FIGURE 3 so as to lie in optical registry with associated light transmitting apertures 80, 80' in plate 8. Thus, as FIGURES 2 and 3 indicate with the illumination from lamp 9 (rays L), impinging relatively normally on the bottom of plate 8 to be transmitted through apertures 80, 80' (rays L'), slit SG, for example, will lie in optical registry with an associated aperture $80_g$ so as to be illuminated and so as to direct light therethrough (rays L') onto associated detector cell LG for energization thereof, absent on intermediate punched card. In a similar manner, strobe slits S1, S3 etc. will lie in optical registry with associated apertures $80_1$, $80_3$, $80_5$ etc. for the illumination of associated strobe detector cells C1, C2 etc.

The above-indicated arrangement and especially the special relation of strobe plate 8 and strobe detector package 6 is indicated more particularly (in fragmentary manner) in FIGURE 3, wherein the detector modules DG, D-1, D-2 etc. are shown in fragmentary fashion, some being exploded out of base 63; mask 61 also being shown exploded away. It will be apparent that strobe base or housing 63 is longitudinally slotted to include two sidewalls 63' defining a slot 630 having a base portion 64. Slot 630 is adapted to receive and position the array of detector modules DG, D-1, D-2 etc. in alignment (as indicated schematically in FIGURE 4). Detectors DG, D-1 etc. are fashioned to be insertable in prescribed alignment along bottom 64 to be positionable along a strobe axis in a convenient manner; for instance, by the insertion of pegs P into corresponding bores in bottom 64.

It will be evident that the strobe slits S1, S3 etc. may each assume any convenient similar cross-sectional size within any area defined by the width of a card-column and by the height of the "un-punchable" strips between card rows. The width is preferably as small as possible, to provide a sharp timing signal; being sufficiently large however to provide a signal of suitable amplitude. It has been found, for instance, that dimensions of 0.050" wide by 0.020" long (length along axis A) were suitable for this purpose in the disclosed embodiment. Similarly, the gate slit $S_g$ might be about 0.050" wide by about 0.300" long. The width of $S_g$ is made sufficient to fit between data rows, and its length made sufficient to generate a sufficiently strong gating signal for photo-detection. In practice, however, in place of gate detector DG, it was found convenient to use an upstream reading strobe arrangement similar to punch strobe arrangement 6 as noted below. According to a feature of this system, strobe slits S1 etc. may be made extremely narrow for more accurate timing using a detection circuit according to the invention which responds to the slope rather than to the level of the detector cell output, as described relative FIGURE 10.

According to another feature of this application, the width of the gate slit $S_g$ might itself be employed to discriminate against accidental perforation-strobing. For example, a pair of accidental perforations, such as staple holes, might be accidentally spaced to simultaneously uncover both gate slit $S_g$ and one or more of strobe slits S1–S79. This could generate an erroneous strobe pulse or pulses. However, if the gating detectors are designed to require a greater, "threshold" amount of light, corresponding to the undercovering of an increased "gate-slit area" of cell LG, such an error could not occur since the width of the staple holes would be insufficient to provide this amount of light. For example, if the gate slit $S_g$ were made twice as long as the longest (along axis A) likely accidental hole and detector DG were arranged to "fire" only after at least half of this length were uncovered; holes, such as the above staple holes, which are shorter than this could not initiate the gating of strobe cells $C_1$–$C_8$, whereas passage of the trailing card-edge could.

As suggested above, strobe mask 61 may comprise a removable glass slide constructed to be light-opaque except for the slits $S_g$, $S_1$ etc. therethrough; forty strobe slits $S_1$–$S_{79}$ being shown to correspond to forty "punch-positions" at punch head 2. It will be evident that a different number of (perhaps differently spaced) processing positions can be arranged for other processing modes. Mask 61 is slideably inserted in grooves 65 along sidewalls 63'.

Detector blocks D1, D2 etc. are constructed and located for convenience and economy, as are detector strips C1, C2 therein. Thus, for instance, the first photo-detector C1 is provided of a suitable size and response to be charged sequentially by five successive strobe slits S1, S3, S5, S7 and S9. By selecting photo-voltaic strips C1 etc. of a particular material and detecting them in accordance with a prescribed detection circuit (indicated below), it has been found that sequential increments of light-radiation from associated group of strobe slits can each be made to partially energize a common cell strip to generate successive output step pulses indicating the position of trailing edge TE. It is preferred to group from about five to about ten strobe slits to energize a single strobe detector cell for good system response. Being packaged removably in housing 63, modules D1 etc. are easily pre-positionable with pegs P in prescribed locations along bottom 64 for easy removability and reliable replaceability. Where desired, detector modules D1 etc. may be provided with end-walls to optically isolate their associated cells C1 etc. from adjacent cells. It has been found that detectors D1 etc. should be located along bottom 64 preferably a prescribed minimum distance below masking plate 61 to achieve a light-tight "optical well" which is rendered relatively insensitive to stray illumination, that is, light other than that which passes normally through slits S1 etc. It was found in the use of standard punched card stock, for instance, that the paper itself under certain conditions, may transmit (diffused) light to energize cells C1 etc. unless they are spaced sufficiently therebelow. However, spacing cells C1 etc. below mask 61 on the order of at least about one-half inch has been found to sufficiently reduce such stray light to insignificant amounts.

With this arrangement it has been found that detector cells LG, C1, C2 etc. can be satisfactorily provided using photo-voltaic "N on P" types of solar cell strips, about 0.10" wide; the strobe strips C1, C2 etc. being about 0.850" long and the gate strip CG being about 0.300" long. Silicon type cell strips are preferred; however, equivalent material may be used, which has sufficient recovery speed, saturation and low-impedance characteristics. Silicon is also preferable in that it may be incrementally energized along the strip length to exhibit stepped output levels that are all perceptible and detectible (staircase effect) over a 5–10 slit length. The speed and step increments of cadmium sulfide and of selenium material have been found somewhat less satisfactory. The light from lamp 9 is preferably matched in wavelength to a favorable response-wavelength for the detector strips and kept below an intensity which will saturate them.

Workers in the art will recognize that the above describes an advantageous strobing, record-tracking arrangement, especially adapted for "position-to-position" control of transport means associated with data processing stations. In summary, this application generally comprises a plurality of aligned strobe detector means together with an associated properly slitted mask means for generating strobe pulses representing successive incremental positions assumed by a passing superposed document, these positions being detectable asynchronously as the document is transported past. Additionally, where it is desired to strobe from different portions of a reference document-edge, this arrangement may be made adjustably positionable along selectable strobe axes with a novel clamp means. Further, where accidental strobe-perforations are of concern, there has been provided "alert" means including gating detector means and associated mask means, which, together with an electronic ordering arrangement (described hereinafter) can "enable" the strobe detector means at meaningful times only.

Strobe functions

While the operation of this strobing arrangement is indicated above, it may be helpful to summarize it as follows: Assume that strobe package 6 is mounted upon clamp 7 so as to be aligned along strobe axis A and (referring especially to FIGURE 1) assume that card C has been advanced across strobe plate 8 so that the trailing edge TE thereof is just uncovering the third plate aperture in line, i.e. aperture $80_5$. At this time strobe detector cells C2 through C8 will have been "disabled" and initial detector cell C1 (for slits S1–S9) will have been "enabled" by alert detector DG, a fixed time after the latter was charged by passage of reference-edge TE past gating slit $S_g$ exposing cell LG to sufficient incident light through hole $80_g$ from lamp 9. Edge TE will also have passed the first and second strobe holes $80_1$, $80_3$ so as to expose initial strobe slits $S_1$, $S_3$, thus having placed a first and second light charge upon first cell C1. As explained below, in connection with the detection circuit, this will cause the generation of first and second "strobe signals," and thereafter, the exposure of third aperture $80_5$ and associated slit $S_5$ will produce a third "strobe signal." It will be evident that these "strobe signals" provide a tracking indication of the instantaneous positions of card C, and especially the columns thereof passing under punch head 2, as the card is advanced by transport means 4. These strobe signals may be used, as indicated below, to initiate a "stop" signal for controlling motor 41 to decelerate, bringing card C to a stop under punch knives 23A, 23B, at prescribed "punch positions," for which a computer memory (not shown) indicates that portions of associated columns are to be perforated. For instance, the strobe signal from slits $S_1$, $S_3$ indicate punch time for columns 1, 2 and columns 3, 4 respectively. Thus, as the transport 4 causes trailing edge TE to expose slit $S_5$ another "strobe signal" will be generated indicating the passage of card-columns 5 and 6 under knives 23A, 23B (above mating die holes $25_a$, $25_b$) which signal, in turn, may be employed to stop transport motor 41 so as to dispose these columns precisely for punching. Thereafter, transport means 4 will resume advancing card C so that card edge TE uncovers slits S7, and later S9, to complete a sequence of five successive strobe pulses by strobe cell C1. Thereupon, the electronic strobe ordering arrangement (described below) will then "enable" the next detector cell in line (C2). Similarly, when slits S11 through S19 have been uncovered and five strobing signals produced by detector C2, then cell C3 will be enabled etc. In a similar fashion, cell C3 through cell C8 are enabled for slits S21 through S79. Thus, a series of forty "strobe signals" will be generated by strobe arrangement 6, each indicative of the passage of an associated pair of card-columns past punch station 25. These "strobe signals" may provide forty appropriate "stop" signals for transport motor 41. However, it will be evident to those skilled in the art that this arrangement and the signals therefrom may be applied for other purposes, such as to control the selective actuation of punch knives 23A, 23B. It will be apparent that the position of strobe array 6 and asosciated plate 8 may be adjusted for various purposes. For instance, the strobe arrangement may be moved upstream away from die 25 a prescribed amount (an "offset distance") to accommodate a predetermined stopping delay-time associated with the operation of transport means 4. Alternatively, an electronic delay may be provided for this purpose.

It will be apparent to those skilled in the art that the above-described elements of strobe arrangement 6 may take other equivalent forms, materials and dimensions within the contemplation of the invention. For instance, masking plate 61 may be comprised of metallic or fibrous material and include a differently arranged pattern of strobe slits thereon corresponding to the arrangement of document processing zones. It will also be apparent that while the strobe and gate detectors D1 etc. and DG have been described as detecting a trailing record-edge, they may be modified to detect other "end-of-record" reference segments, such as printed or punched marks, patterns and the like, even when associated with other data processing record media.

Transport control

Figure 7:
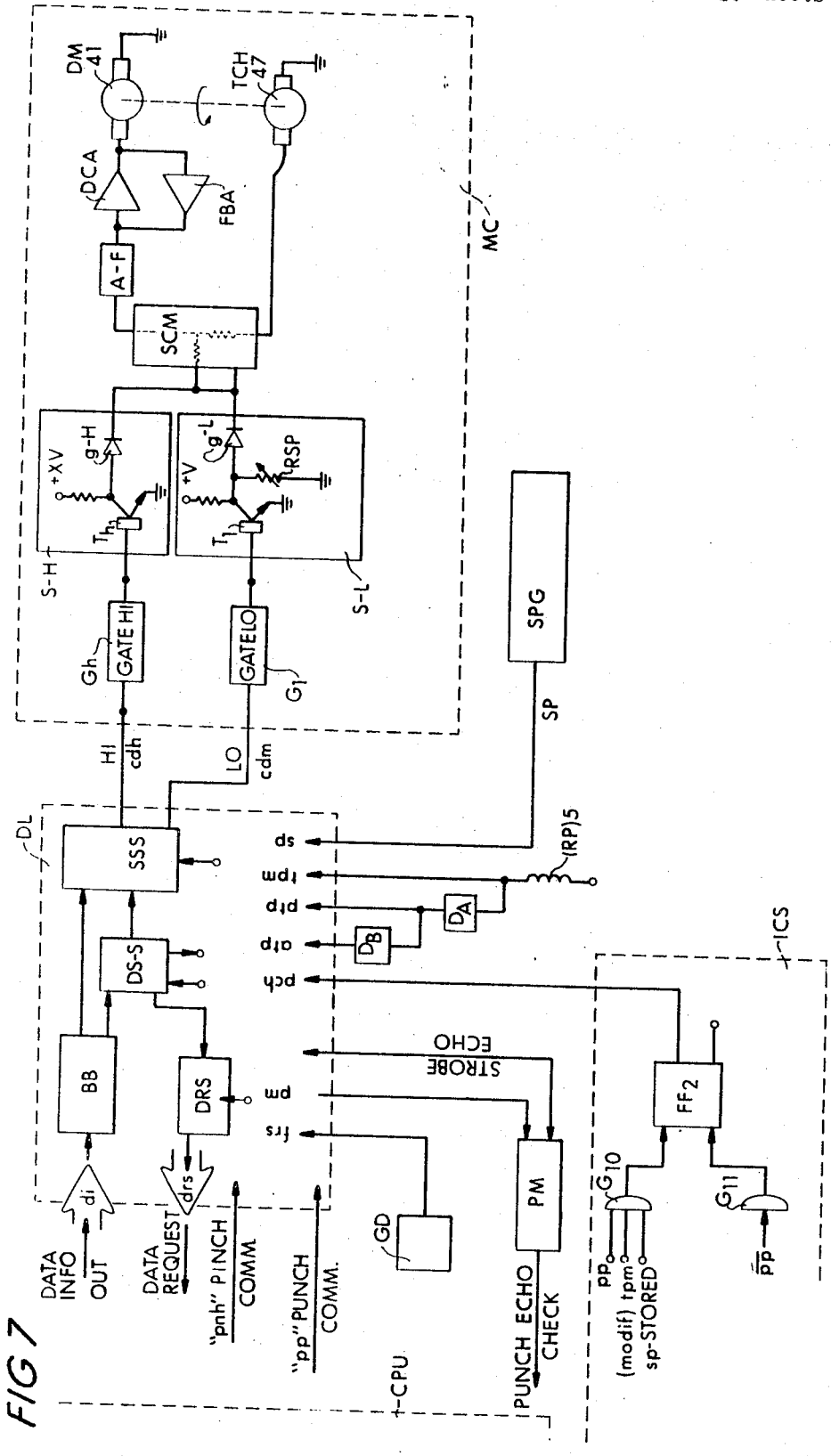
FIGURE 7 is a general schematic block diagram of the electronic control arrangement for employing the strobe and other signals developed by the illustrated strobe-punch arrangement to control the record transport means and processing means acording to a preferred embodiment of the invention.

It will be apparent from the above that strobe arrangement 6 may provide a control pulse for controlling the speed of card transport means (e.g. motor 41) at prescribed "strobe-times" corresponding to the times when prescribed record zones (card-columns-pairs) come adjacent punch head 2 or the like. More particularly, as indicated in FIGURE 7, the "strobe pulses" generated by strobe array 6 are functionally indicated as emanating from a strobe-pulse-generating block SPG and connected to be applied to decelerate (or stop) card-advancing transport motor DM (or 41, see FIGURE 1). Thus, motor DM may be adapted to be decelerated every time a strobe pulse is impressed thereon, such as by a switching circuit which causes the driving field through the coils thereof to be reversed for a period sufficient to bring the velocity of the motor shaft 43 to zero (stopped), this being detected by tachometer TCH (or 47). By this or other arrangements, appreciated by those skilled in the art, it will be apparent that the "strobe signals" of this arrangement may be used to control the speed (driving torque) of record-transport means.

This control arrangement finds especially apt application in controlling strobe-responsive, electrically-actuated, low inertia transport systems such as result from directly coupling a field-reversible motor to a transport shaft without employing mechanical clutch or brake means. The card-advance system 4 including motor 41 may be presumed to be such. It will be evident that clutch/brake advance systems undesirably vary in response with life and cannot provide a reliably constant record translation as can the field-coupled system. For instance, a clutch or brake device will change in its own response characteristics due to changes in environmental heat, moisture, etc. and to wear of contacting surfaces. Further, such mechanically-coupled systems are much less versatile and inconvenient to shift in torque output. A conveniently variable torque output level will be recognized as useful for unit record card-advancing systems for card-punches; where for instance, variations in card-to-drive roller engagement will require output torque adjustments. Such variations commonly result from changes in card-weight, thickness, moisture-content, materials, pinch-roller pressure, supporting surfaces and the like. Using a field-coupled advance means controlled purely electronically according to the invention provides a very convenient control over record movement. Such a system is also uniquely accurate in being referenced to incremental record positions under the control of signals from the above-described strobe arrangement. Controlling a transport system 4 with a card-position-referenced strobe arrangement according to the above arrangement compensates automatically for variations in the card load and transport mechnism characteristics for constant accurate card placement impossible with conventional means.

A correlative control for transport motor 41 is provided by "punch-cycle referencing means" associated with the punch head 2, namely a reluctance pick-up RP (5) adapted to generate pulses periodically indicative of the phase of punch means 21, being adapted to detect the angular position of a portion of a constantly-rotating drive shaft therewith. Thus, a "start" (or "go") signal may be provided by pick-up RP to cause transport motor 41 to be initiated at times referenced to the state of punch head 2; for instance, when the punch knives 23A, 23B thereof have been retracted after a punching excursion. As will become more apparent from the following description (in re FIGURES 7–12), the strobe signals generated by strobe array 6 provide a "position-to-position" control for card transport 4 and unit records C translated thereby.

*Ordering arrangement*

The strobe detector ordering arrangement, or tracking logic, is more particularly indicated in the schematic block diagram of FIGURE 9 wherein there is generally shown a strobe generating means SGM adapted to provide strobe output signals SP at output terminal P, the ordering of these signals and the time-occurrence thereof being controlled in the new improved manner by electronic ordering means in logic block OM and associated initiating "alert" means AD, as described below.

Strobe generation means SGM evidently comprises the array of strobe detector cells C1 through C8, described before, the output of which is applied to the input of a detection means DET, being coupled thereto through associated preamplifier means P1 through P8, respectively, together with associated gate means G–1 through G–8 respectively, and a common buffer line B. Gate means G–1 to G–8 are selectively enabled by ordering arrangement OM as indicated below. Detector DET comprises, preferably, a differentiator means for producing pulses representative of the slope of the stepped ("staircase") output from strobe cells C1 through C8 and has the output thereof coupled to an amplifier means A, the output of which is applied to an adjustable delay circuit ADS. Differentiator DET is "slope-sensitive" rather than "threshold-level sensitive" as with some related prior art detection means. Delay ADS preferably comprises a period—variable single-shot delay multivibrator for producing a prescribed output pulse; the length (occurrence of trailing edge) thereof being adjustable within limits. Delay ADS can effectively relocate strobe package 6 relative to punch station 25 and thus provide adjustable "stop time synchronization" for different transport drive means, as seen below. Delay ADS has been found capable of a fine-control over "stopping-position" to within ±0.005″. Components DET, A and ADS are preferably comprised as indicated in detail in the schematic circuit of FIGURE 9 which is described below.

The output from delay ADS is applied to output terminal P and thence to control means associated with drive motor 41 (FIGURE 7) to initiate a "stop" command therefor at times related to the detection by photocells C1 through C8 of the passage of a trailing card-edge. These "stop-signals" are arranged to be generated at times which will allow motor 41 to decelerate a moving card to stop at a prescribed "punch-position."

However, as indicated, the order in which such strobe pulses are applied at output terminal P is controlled by the electronic ordering arrangement OM and the associated initiating means or "alert detector" AD. Alert detector AD will be seen to provide an "initiate" signal for strobe generation means SGM and ordering means OM, after which time the output from strobe generation means SGM is "enabled" according to the logical, ordered control of unit OM. Unit OM controls the output from cells C1–C8 at gate means G1 through G8, along connecting lines LL therebetween. Thus, output terminal P is coupled to a "counter-delay" means D and a "reset-delay" means D'. Counter-delay D is coupled to a five state counter FC and is adapted to prevent the simultaneous initiation thereof with counter gate CG as indicated below. Five state counter FC is a counting means (e.g. register) adapted to provide one output pulse at output terminal C thereof for each five input pulses applied thereto as known in the art. FC preferably comprises a plurality of flip-flop stages arranged to be resettable at terminal R as indicated below. The output from counter FC is thus applied to the counting gate CG and also to a last code detector means LCD described below. Counting gate CG is adapted to apply an initiating signal to an associated eight-state counter EC, for the initiation thereof upon the simultaneous occurrence of an output from counter FC and a following strobe pulse from terminal P. Counter EC is adapted to provide one output pulse for every eight input pulses and thus may comprise a plurality of flip-flop stages arranged as known in the art. Counter EC has its output coupled to last code detector LCD in common with companion counter FC, the connection being a two-line connection to counters EC, FC, as shown. The outputs from the flip-flop stages of counter EC are also applied to a decoding matrix DM comprising eight decoders and inverting means to decode the eight different states of the flip-flops associated with EC into eight different "gating" signals, each of which comprises an "enable" pulse along an associated one of gate lines LL connected to an associated one of the strobe gates G1 through G8.

Last code detector LCD comprises a gating means adapted to apply an output signal to the terminal of reset gate G' when input signals from counters FC, EC applied thereto both indicate "terminal count" states (i.e. "all strobe pulses received").

Delay means D' also applies an output pulse to reset OR gate G' and comprises any suitable delay means providing an output signal which has a period of slightly more than the normal "transit time" of records past strobe cells C1–C8. That is, delay D' corresponds to the time between the incidence of the first strobe output pulse (from first detector cell C1) and the last strobe output pulse (from last detector C–8), given a normal transport mode (e.g. above a minimum speed) of a card therebetween. Delay D' may, of course, be made adjustable to accommodate different transport speeds, different length cards C, etc. This would facilitate converting the arrangement described from 80-column cards to 51-column cards, for instance. The logical output from OR gate G' is coupled to reset amplifier A' and thence to reset output terminal R. Reset terminal R is, in turn, coupled to reset terminals $R_F$, $R_E$ of counters FC, EC respectively for the automatic selective resetting thereof as known in the art. Thus, the output from amplifier A' is adapted to reset counters FC, EC, as well as to reset alert flip-flop FF, as noted below.

As indicated above, an alert detector arrangement AD is also provided according to the arrangement and preferably comprises an alert flip-flop FF coupled to reset terminal R to be reset automatically by the output from amplifier A'. Flip-flop FF has the "set" terminal thereof coupled to be activated (set state) by alert detector means such as detector GD, FIGURE 1, or by Final Read Strobe cell RSM or detector DG (FIGURE 4). The output of this alert detector is coupled to FF through an alert-delay means D''. It will become apparent that alert detector GD (associated with slit RS80) is functionally equivalent to detector DG and may replace it to provide the above described functions. Thus, gating detector GD may comprise a photo-detector arranged to be energized by passage of a trailing card edge and disposed upstream of initial strobe detector C–1 by a prescribed distance, as with detector DG. In practice, however, detector GD comprises a photodetector arranged to be charged by the terminal strobe slit RS80 in an upstream reading strobe means RSM (FIGURE 4). Thus, the "final strobe signal" (last column count signal) from Read-Strobe RSM may be applied to reset flip-flop FF indicating the approach of a trailing card edge to punch strobe means 6 and mask 61 thereof. The location of the alert detector means can be effectively provided by coupling prescribed delay means to the output thereof, given fairly predictable transport speeds. For instance, alert delay means D'' will be seen as providing a delay period sufficient to accommodate the transit of a trailing edge TE from alert detector GD to initial strobing slit S1. As with delay means D', D'' may be made adjustable to accommodate different transport speeds where alert detector DG substituted for GD, delay means D'' will be adjusted to compensate for the location thereof.

While the above indicates the operation whereby ordering means OM sequences the outputs from strobe gates G–1 through G–8 in prescribed order, being initiated by alert detector means AD, this operation may be recapitulated as follows. With reference to exemplary card record C in FIGURE 1, let it be assumed that this card has a score SC therein as is common for providing detachable portions in returnable media, such as with punched card utility bills. Further, assume that score portion SC has a prescribed width W. In such a case, as card C is advanced across strobe platform 8, score SC will expose upstream alert detector GD and thereafter expose strobe detectors C1 through C8 (via slits S1–S79) before the trailing edge portion TE exposes them and likely lead to "accidental," erroneous strobe signals therefrom. The ordering arrangement provided by the invention will prevent this as follows. If score SC exposes alert detector GD sufficiently (is wide enough), an output pulse therefrom may be applied to set flip-flop FF after a prescribed delay period, provided by alert delay D''. This delay corresponds to the time it takes score SC to reach the first in line of the strobe apertures ($80_1$, $80'_1$) and the associated strobe slit (S1). Thus, delay D'' "effectively locates" detector GD adjacent initial strobe slit S1. It will be presumed for the moment that flip-flop FF and counters FC, EC have been reset so that the "G1" line from decoder DM has likewise placed an enabling signal on gate G1 only, the other gates being disabled. However, alert detector GD and delay D'' have been arranged so that signals from scores having widths $w$ below a typical maximum are inadequate to provide a starting signal for delay D'' and thereby ignored.

An equivalent alert signal amplitude discrimination may be provided by merely locating an alert detector, such as detector DG in FIGURE 4, a distance CO from initial strobe slit S1 so that DG is responsive to scores of any width and providing a two-legged gate GG coupling detector DG to delay D''. The other leg of gate GG would be coupled to the output from first strobe cell C1 so that delay D'' and flip-flop FF would not be fired unless coincident outputs were applied from detectors C1, DG—this corresponding to scores having a width greater than distance CO. As stated, CO is arranged to be larger than the largest expected score width. Thus, when score SC reaches axis G—G, the detector GD output will be applied to set flip-flop FF into its true (or "up") state to apply an enabling signal to gate G1. Of course, delay D'' would in this case be set to effectively located alternate alert detector along prescribed alert axis G—G, spaced from slit S1 by distance CO.

Now, if score SC were sufficiently wide (wider than distance CO)—then gate detector GD would have been energized sufficiently long for the enabling signal to open gate GG and set flip-flop FF to open gate G1 so that when score SC exposed slit S1 to charge associated detector C1, gate G1 would "open" to pass the output signal therefrom to buffer line B. This strobe signal would be processed at detector DET, amplified at A and delayed at ADS to provide an erroneous "Stop" signal for motor 41 at terminal P. However, since spacing CO was selected to be larger than any score width (W), the output from detector DG will necessarily have disappeared from gate GG before the output from detector C1 is applied thereto. Thus, it will be apparent that only a score larger than a prescribed maximum width (CO—and this effectively means only a trailing card edge TE) will allow the output of initial strobe detector C1 to be gated through G1 to provide output strobe pulses at terminal P.

However, when proper strobe output pulses are produced by detection of a trailing card edge, it will be apparent that gate G–1, having been enabled by decoding means DM at "reset" time, will then pass a total of five pulses to terminal P, corresponding to exposure of slits $S_1$, $S_3$, $S_5$, $S_7$ and $S_9$. Consequently, five initial stroke pulses will be applied to the ordering arrangement OM; that is, specifically, to reset delay D', to gate CG and to five-state counter FC, through delay D. It will be understood that the first four of these strobe pulses will step counter FC to apply an enabling pulse at gate CG a short delay time (corresponding to delay D) after the fourth pulse. Thereafter, the fifth strobe output will be passed by gate CG to step eight-state counter EC to its next state, and so to generate an output which, through decoder DM, will enable the next gate in line (G2), disabling all others. Delay D will be seen to allow the fourth count output from counter FC to persist during occurrence of the fifth pulse. This provides a suitable short delay between strobe pulses just sufficient to delay the application of every fifth pulse to counter FC enough to allow the preceding output therefrom to overlap and maintain gate CG "on" so the fifth pulse can be passed to step counter EC. For instance, delay D may comprise a suitable passive (e.g. R-C) delay, a delay multivibrator or the like.

Later, when the second strobe detector in line (C2) has been energized four times to provide four step pulses through associated gate G2 to step counter FC to its fourth state, the FC output is coupled to enable gate CG, so that the fifth strobe signal (corresponding to exposure of slit S19) will be passed by gate CG to step counter EC into its next state, thus enabling the next gate in line (G3), and disabling all others. In a similar manner, the detector cells C3 through C8 will be controlled so that the outputs therefrom are sequenced at their associated gates G3 through G8, thus preventing the accidental emission of output pulses therefrom before the arrival of trailing card edge TE. It will thus be apparent that the ordering means OM provided according to this arrangement, in conjunction with the alert means AD, not only provides a protective system for discriminating against accidental, "score-induced," strobe pulses, but further provides this in an advantageous electronic ordering arrangement, which uses a minimum number of photo-electric detector means.

Those skilled in the art will perceive that this ordering concept may be modified, for instance, to dispense with alert detector means, where feasible. For example, an ordering means might be provided to count strobe cell output signals and gate succeeding cells after each five strobe pulses. Also, tachometer voltage could be integrated to measure distance (transport shaft travel) traveled after occurrence of the initial strobe signal from each strobe cell. In such cases, however, score discrimination would have to be forfeited, or else, internally discriminated by initial strobe cell C1; such as by triggering on a prescribed minimum amplitude output therefrom.

It will be appreciated that another feature of the above-indicated strobing and ordering arrangement is that since the described strobing detectors indicate "strobe times" by turning detector means "ON" rather than "OFF" that these detectors may thus be made more "Fail-Safe," accidental "Turn-On" being unlikely. Further, strobe detectors may be kept "ON" during an appreciable portion of card-transit time, and thus be kept available the while for other functions, such as jam-checking, monitoring a following card and the like.

According to another feature of this ordering arrangement, the ordering means OM and alert means AD may be "reset," i.e. returned to their initial state, independently of the detection of strobe signals or the counting thereof. Thus, for instance, if one or more strobe counts are missed for any reason, ordering means OM and alert means AD may be still automatically returned to their starting condition for the proper strobing of a following card, thus preventing the perpetuation of any counting or strobing errors. Hence, it will be seen that the first strobe output pulse (corresponding to exposure of slit S1) will "start" reset delay D' which, after a prescribed delay period, will apply an enable pulse to reset "OR" gate G'. This delay corresponds to the transit of card edge TE from the first slit S1 to the last slit S79 given normal transport speeds. Reset-gate G' will buffer this pulse to amplifier A' which, in turn, will apply a "reset signal" at terminal R for application to reset flip-flop FF and counters FC, EC. However, this "delay-reset" mode will normally be ignored, reset being otherwise invoked well before the delay time if a correct "strobe count" has been had. That is, the sensing of strobe pulses from all of the forty strobe slits S1 through S79 will cause "full" output signals from counters FC and EC which will be applied to initiate detector LCD. Detector LCD may comprise "AND" gate means indicating detection of "last-code" and adapted to provide an enabling output at reset-gate G' which, via amplifier A', will reset flip-flop FF and counters EC, FC.

It will be apparent to those skilled in the art that the above-described electronic ordering arrangement in association with the indicated record strobing arrangement can provide a "position-to-position" control for record transport means, such as drive motor 41, and especially in conjunction with punch mode indicating means (such as pickup 5) the arrangement can provide a continuous control of record transport systems so as to enable the controlled incremental advancement of records through a processing station (especially for impact processing as with a punch) with accurate referencing and incremental control thereof. The arrangement can control an electronic variable torque transport means to advance records at one of several different velocities (from zero velocity, or stop, up to maximum velocity, or "high-speed skip").

The slits S1 etc. in strobe package 6 and associated signal generating means will be seen as providing a positional feedback signal to transport control unit MC (FIGURE 7) for each punch position. Such signals can provide the basis for "look-ahead" process control logic whereby position-referenced operations may be anticipated without added taxing of computer memory. Accordingly, motor 41 may, for instance, be controlled to always assume Low speed before final stopping deceleration, even though a Higher speed mode is used, thus assuring invariant stopping distances. Those skilled in the art will perceive that multiple slits may equivalently be provided for each processing position for plural position feedback signals to provide finer deceleration control. One might even provide a continuous strobe pulse which the motor servo could be made to "follow."

*Detect/amplify circuit*

Figure 9:
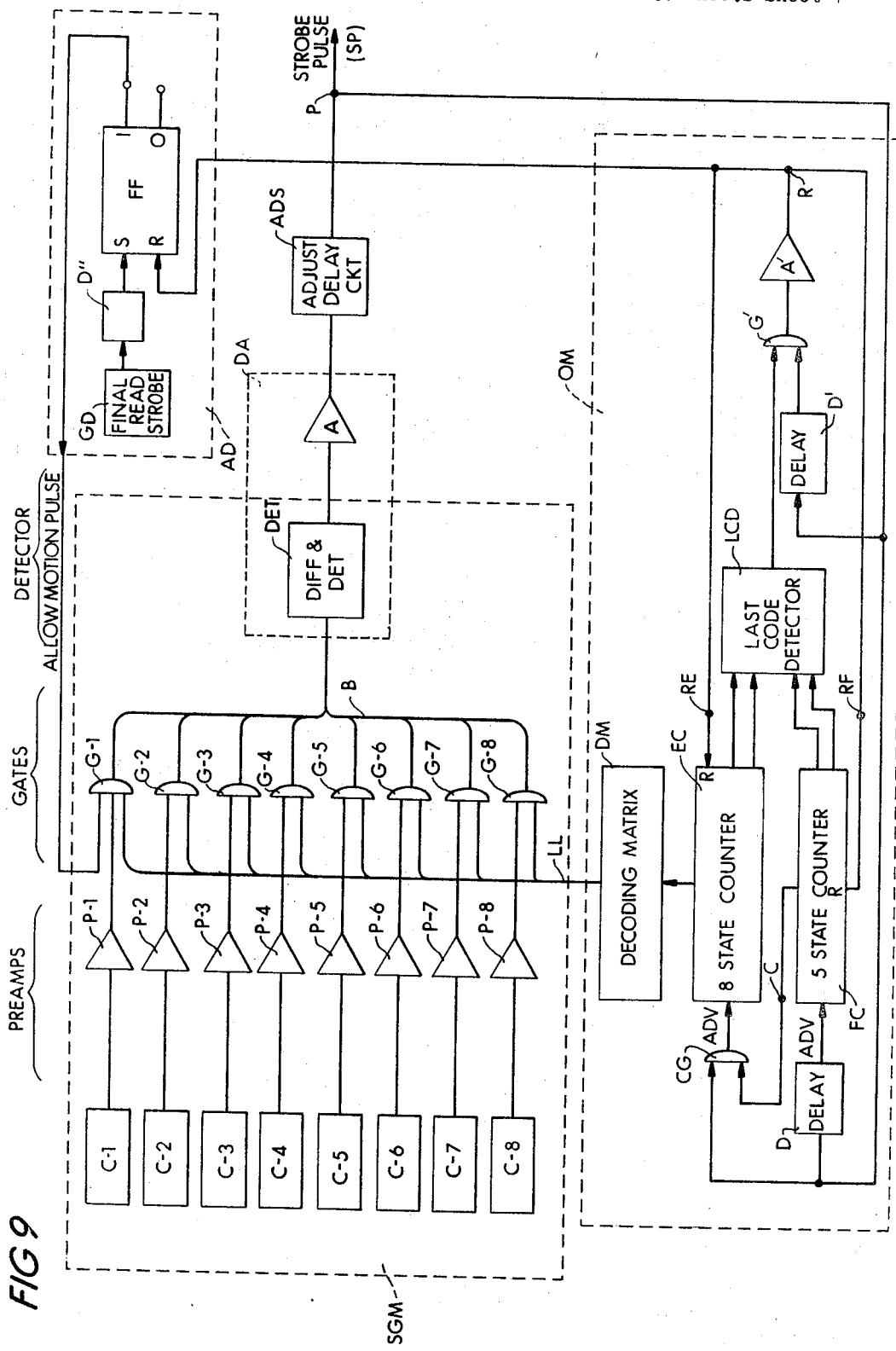
FIGURE 9 is a block diagram of the electronic tracking arrangement for employing signals developed by the strobe arrangement of the invention.
Figure 10:
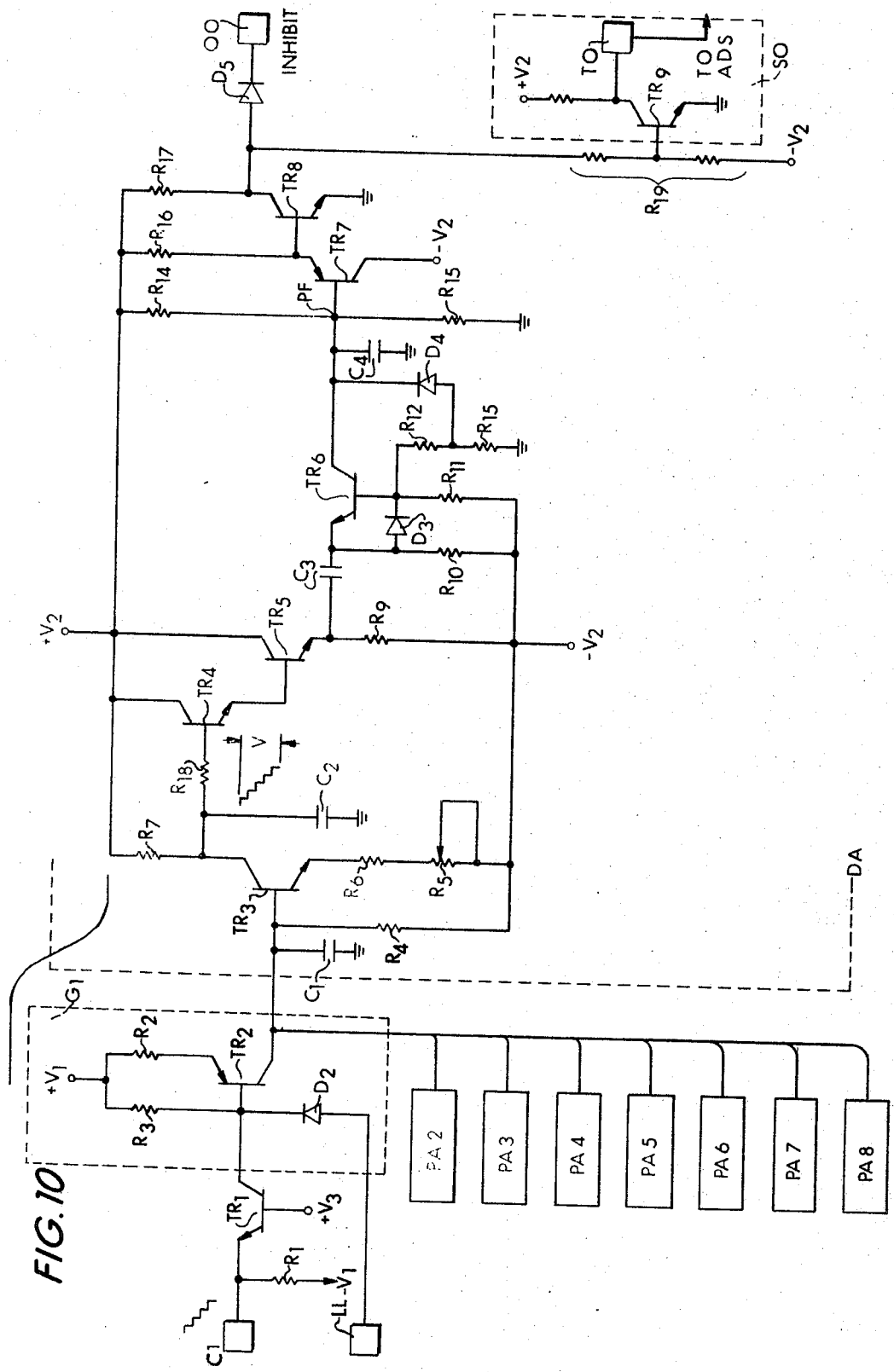
FIGURE 10 is a schematic circuit diagram of the amplifier-detector portion of the arrangement in FIGURE 9.

FIGURE 10 indicates a particular schematic circuit embodiment of the detector-amplifier arrangement DET, A indicated in FIGURE 9. FIGURE 9 indicates gating circuits G1 through G8 and preamplifiers P1 through P8 associated with each of the strobe detector cells C1 through C8 respectively. These gating-detector arrangements are grouped into a set of detector blocks PA1–PA8 in FIGURE 10. Detector block PA1 is indicated in particularized schematic form as representative of the other, like detector blocks PA2 through PA8. More particularly, detector block PA1 is adapted to provide a series of five strobe output pulses, in a staircase form (as indicated) upon receipt of the simultaneous gating signals along conductor LL and successive strobe cell output signals from cell C1. The strobe signals applied from cell C1 are coupled to the base of switching transistor TR2 through a detecting transistor TR1, while the gating signals are applied along conductor LL and coupled to the base of TR2, through a gating diode D2. Transistor TR1 is connected between a voltage V3 at the base thereof and, through a resistor R1, to voltage −V1 at the emitter thereof. Voltage V1 is impressed across the emitter-base junction of transistor TR2, being coupled thereto through a pair of resistors R3, R2 respectively. The output from transistor TR2 is applied to the base of an amplifying transistor TR3, being smoothed by the filtering action of a capacitor C1. Through a bias resistor R4, the base of TR3 is coupled to voltage −V2. Transistor TR3 has its emitter terminal coupled to voltage −V2 through a load resistor R6 and a potentiometer R5, having its collector terminal coupled through a resistor R7 to voltage V2. The colletcor output from transistor TR3 is applied to the base of an amplifying transistor TR4 via a parasitic suppression resistor $R_{18}$ and a filtering condenser $C_2$. The output of TR4 is cascaded with an amplifying transistor TR5 connected as an emitter-follower to provide an output at a differentiating condenser C3 and an associated resistor R10. Transistors TR4 and TR5 have their collectors connected in common to potential V2 while the emitter of TR5 is coupled through a load resistor R9 to potential −V2. Condenser C3 and resistor R10 act to differentiate the output from emitter-follower TR5, the signals developed thereby being coupled through a "slope-detecting" transistor TR6 to a reference point PF, with a smoothing capacitor C4, being provided between point PF and ground. Transistor TR6 is provided with a clamping diode D3 between emitter-base and has its base terminal coupled through a base resistor R11 to potential −V2 and, through a pair of voltage dividing resistors R12, R15, to ground. The voltage divider output is connected, together with a clamping diode D4, to clamp the collector-base of TR6. In most cases, however, resistors R11 and R12 as well as diodes D3 and D4 may be shunted-out and effectively eliminated. Reference point PF constitutes the mid-point of a voltage divider R15, R14, between ground and potential V2 and is connected to the base of a current amplifying (emitter-follower) transistor TR7. TR7 has its collector connected to potential $-V2$ and its emitter connected, through a resistor R16 to potential V2, and also to the base of a transistor switch TR8. Resistor R17 couples the collector of TR8 to V2. A diode D5 couples an inhibit signal on input terminal "00" to inhibit the TR8 output, and is also connected through a voltage divider R19 to potential $-V2$. The mid-point of divider R19 is coupled to the base of an output switching transistor TR9 whose emitter is coupled to ground and where collector is coupled to $+V2$ and to output terminal TO.

Thus, it will be apparent that the individual stepped output pulses from any of strobe detector cells C1 through C8, once properly gated, will be amplified and slope-detected to, in turn, produce relatively equal strobe output pulses, one pulse for each "staircase" level of a prescribed form using the above improved detecting amplifier means. This detecting amplifier represents an improvement over commonly used arrangements, for instance, by detecting the slope (rather than the level) of the strobe cell outputs; thus, being less subject to error and less affected by the degeneration of strobe output signals. Thus, for instance, more slits, such as S1 etc. may be provided in common to energize an individual detector cell (C1 etc.), where preferred, without concern over degeneracy of the output step-value.

Control block

FIGURES 7, 8, 11 and 12 indicate the manner in which transport motor 41 and associated elements are controlled according to the invention by a control system which, in turn, is responsive to indicating signals from means associated with the overall punch mechanism, such as alert gate GD, strobe package 6, punch-synchronizing reluctance pick-up coil 5, etc. Thus, referring to FIGURE 7, there is indicated schematically a punch control system DL arranged to receive indicating signals as above-mentioned to communicate with the central processing unit CPU of an associated computer and, in response thereto, to provide speed control signals to motor control unit MC. Control unit DL is arranged as indicated to receive punch command signals "pp" and pinch indicating signals "pnh" from the CPU and, in response to various signals, to provide data request signals "drs" to the CPU. In response to signals "drs" the CPU will cause selection of punch actuation means, such as interposer "ip" (FIGURE 1) associated with punch 23A and driven by solenoid coil i-c (when a "pm" current pulse flows therethrough). Also, in response to the "drs" signals, the CPU will provide "punching-indicated" signals "di" to unit DL, as detailed below.

The indicating signals to punch control unit DL will be more particularly described below, but may be generally referred to as follows. Alert detector means GD will provide a "card-approaching" (trailing edge approach) signal "frs." The reluctance pick-up coil 5 will provide a reference, punch-synchronizing, pulse "tpm," along with a "punch time" pulse "ptp" (a delayed form of "tpm") and a third, "transport-start" pulse "atp" (a delayed form of "ptp"). The strobe pulse generating means functionally indicated as SPG will provide strobe pulses "sp" adapted to control transport control system MC, such as by providing "stop" signals and to provide other signals. An interposer control system ICS is also provided to apply an interposer-actuating signal "pch" to control unit DL. More particularly, system ICS comprises a flip-flop FF2 arranged to be set to provide signal "pch" when an associated AND gate G10 has applied thereto a punch command "pp," plus a delayed version of a strobe signal "sp" and a modified version of signal "tpm." Flip-flop FF2 is also arranged to be reset through a companion AND gate G11 by the arrival thereon of a "no-punching" command "$\overline{pp}$." However, for the balance of the description, it may generally be presumed that flip-flop FF2 has been set to continuously provide signal "pch." Control unit DL also communicates with the punch interposer solenoids, providing magnet actuating signals "pm" and strobe-echo signals therefor. Punch checking unit PM communicates with the CPU applying a "punch-echo check" signal thereto.

As detailed below, punch control unit DL generally functions as follows. Entry of a card to be punched into the punch station at high speed may induce a data request means DRS to control the CPU so as to select interposers for proper punching and also to indicate whether the approaching punch position is "blank" or not, that is, whether there is "no punching" to be done. If blanks are not indicated, a speed selecting means SSS will proceed to apply a "low speed" signal (cdm) to motor control unit MC to more slowly advance the card to the next "punch-position." If however, the CPU indicates "blanks" coming up, a blank detecting means BB will generate a blank signal (2b) and cause selecting means SSS to apply a high-speed command pulse (cdh) to motor control MC. This high-speed "skip" mode allows one to proceed much more quickly to a following position, thus accelerating "throughput" through the punch apparatus, as will be recognized by those skilled in the art.

Thus, it is a feature of the invention to provide a "High-Speed-Skip Control" means whereby the record advance means is controlled to provide a plurality of record advancing speeds according to what operations are programmed for succeeding punch positions. It is a special feature of the invention, according to this control arrangement, that card transport means may be controlled to provide a particular "high-speed skip" whereby cards may be stepped between punching positions at a low advance speed and, when one or more following punch positions are determined to have "no punches" scheduled thereat, a high-speed (skip) mode may be invoked; and following this, the card advanced again at slower speeds through succeeding punching positions; this High-Low Transport modulation being repeatable ad lib. It will be recognized by those skilled in the art that such an "intermediate high-speed skip" feature is new and important in the art.

According to another feature of the invention, control unit DL is adapted to provide these data requesting signals "drs" and motor controlling signals "cdh," "cdm," in either of two modes; i.e. either synchronized with the punch means (e.g. bail 21) or asynchronously thereof, being controlled merely by card position as indicated by strobe unit SPG. Motor control system MC is adapted to control a variable-torque, directly responsive, low inertia motor 41 to be speed-shifted and decelerated by purely electrical means and, in some cases, to also be shifted into two forward speeds, high or low, according to control signals "cdh," "cdm," respectively.

Motor control unit MC functions generally as follows: For the simple start operation, a start signal "cdm" is applied to a gating means $G_L$ coupled to an associated switching means S-L to provide a motor activating signal of prescribed value to sum-comparing means SCM. Unit SCM is also fed by the output voltage from tachometer 47, coupled mechanically to the shaft of advance motor 41 to generate a "velocity-indicating" voltage as understood by those skilled in the art. Unit SCM will couple the energizing signal from switch S-L, to energize motor 41 for "low-speed advance," being coupled thereto through amplifier filter A-F and DC amplifier DCA. Amplifier DCA will apply a prescribed accelerating voltage to advance motor 41. Amplifier DCA is provided with a feedback amplifier means FBA, adapted to accelerate the response of amplifier DCA, to prevent overshoot and the like. It will be seen that signals "cdm," being applied through gate $G_L$, may activate switch means S–L, my application to the base of a switching transistor $T_L$ adapted to apply a reference voltage V to compare unit SCM through isolating diode g–L. A potentiometer RSP may be provided to adjust the level of this voltage and so monitor the maximum reference-velocity (low-speed) that motor 41 may be caused to assume. At any rate, the voltage applied from switch means S–L to compare unit SCM will determine the velocity motor 41 will assume given time to accelerate, being referenced thereto by the output from tachometer 47 as compared with the reference (energizing) voltage V by unit SCM.

Where desired, motor control MC may also provide a second forward speed (or further speeds). That is, a second gating means $G_H$ and switching means S–H may be provided to couple high speed signals "cdh" from control unit DL to compare unit SCM in parallel with low speed signals "cdm." Switching means S–H will be seen to similarly provide a second, greater reference voltage (XV) through a switching transistor $T_H$ and an associated diode g–H. Thus, diode g–L is arranged to couple low speed voltage V to compare unit SCM except at times when companion diode g–H overrides it, coupling higher voltage XV thereto, at which time diode g–L will be reverse-biased to de-couple voltage V. Hence, when signal "cdm," alone, is applied to motor control MC, it will be coupled to unit SCM to drive motor 41 at a normal speed. However, when signal "cdh" is also applied, the output signal induced by signal "cdm" will be overridden so that "cdh" may control motor 41 to assume a high speed level. Adjustment of potentiometer RSP will be seen to enable shifting the level of low speed to which motor 41 is referenced.

Figure 8:
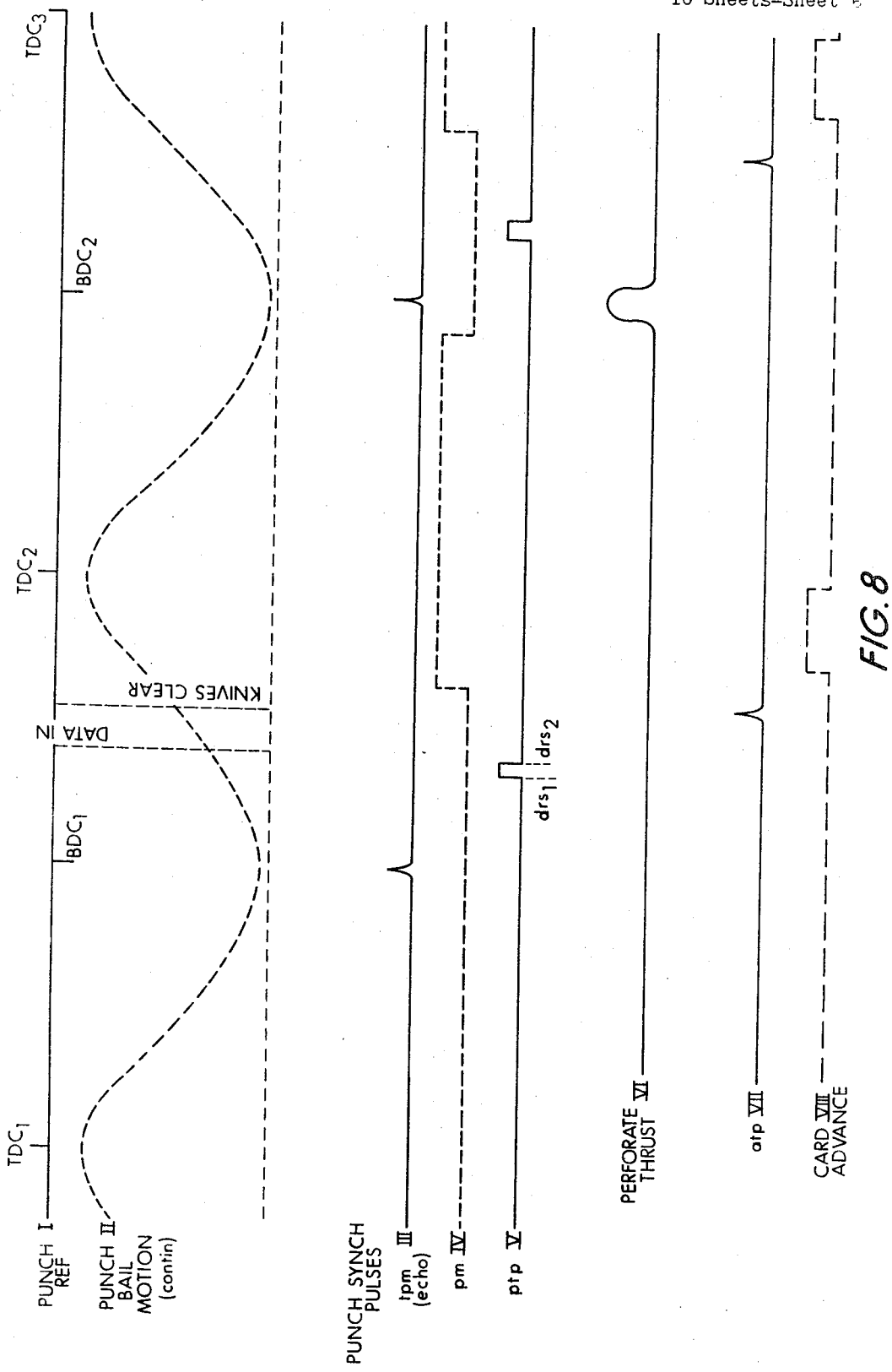
FIGURE 8 is a timing diagram relating some of the signals developed by the arrangement in FIGURE 7 to punch motion.

As indicated above, one of the control modes of punch control unit DL is a synchronous one wherein the control pulses therefrom are synchronized according to the synchronous action of the punch. Reference to FIGURE 8 will better indicate this, whereby the action of the punch is arranged to provide indicating signals for unit DL, illustrating how unit DL provides control signals in response thereto and what these control signals indicate. More particularly, curve II indicates schematically the synchronous, cyclic motion of the punch bail 21 as it continuously oscillates between the extreme positions indicated in curve I, namely top dead center TDC and bottom dead center BDC. It will be understood that as indicated in curve III, reluctance pickup 5 generates an echo (tpm) pulse (also a punch-reference pulse) which is referenced to a constant point in the cyclic motion of bail 21, preferably at bottom dead center BDC, as indicated. As curve V indicates, a delayed version of pulse tpm, namely pulse ptp (a data-request pulse) is then generated, the leading and trailing edges of which may be arranged to provide a pair of "data request signals" "$drs_1$," "$drs_2$" respectively (according to the number of columns punched). The "drs" signals will cause the selecting of punch interposers during the times indicated at curve IV, the interposers being energized (after selection) by current PM for selective thrusting of punches to perforate records as known in the art. A second, delayed form of pulse ptp, namely pulse "atp" in curve VII, is then generated and comprises an "advance" pulse controlling the application of speed-control signal "cdm" to motor 41. Singal "cdm" causes the card to be advanced to the punch position for which ptp selected the proper interposers (via CPU), as indicated in curve VIII. The next bottoming of bail 21 (at $BDC_2$) will cause selective perforation of record C as indicated in curve VI. The punches now having been activated from the punched card, the card may now be advanced to the next selected punch position. As explained below, the above only indicates some of the synchronous operations of the system as referenced upon the motion of the punch. There is also a novel and advantageous, asynchronous operation which is referenced only upon the position of the record C, as seen below, both modes of operation being more particularly indicated relative to FIGURES 11 and 12.

FIGURE 11 indicates the details of elements in punch control DL referred to above. Unit DL includes a speed select SSS, a data request block DRS, arranged to initiate block SSS, a "blank" (no punching) detecting block BB, and a synchronizing block DS–S. Blank detecting block BB is adapted to examine the data provided by the CPU at the instance of signals from DRS so as to initiate selection of a high speed skip mode by SSS for motor control system MC. The elements of selection block SSS are as follows: A flip-flop FF1 is adapted to be "set" to generate the above-mentioned low-speed signal "cdm," being set alternatively by pinch-command signal "pnh" from the CPU or by the output from an AND gate G8. Gate G8 is adapted to be enabled by signals "atp" and "pch," being inhibited by an output signal "dsd'" from synchronizing block DS–S. Flip-flop FF1 is adapted to be reset by the output from an AND gate G3 which, in turn, is enabled upon application of a strobe pulse "sp" in conjunction with a "no blanks" pulse $\overline{2b}$. A second flip-flop FF3 is adapted to be set to emit a pulse cap upon the application of signal "pnh" and to be reset upon application of alert signals "frs" (from detector GD, FIGURE 1) delayed through a delay means $D_1$. Signal cap is applied to one leg of AND gate G2, the other leg of which is coupled to be energized by signals "cdm," to apply a high-speed pulse "cdh" to motor control system MC. Gate G2 is buffered in parallel with a companion AND gate G1, one leg of which is similarly coupled to be energized by signal "cdm," the other leg being coupled to the "blanks-indicating" signal 2b emanating from block BB.

Blank detecting block BB comprises a multilegged AND gate G7 adapted to be enabled when "blanks-indicated" pulses are applied from the CPU to all the legs thereof (one leg being provided for each row, i.e. punch position, in a given column). The signals for each column are applied serially to gate G7 in response to the application of signals "$drs_1$, $drs_2$" for each column, respectively, in the two-column punching mode. The output of Gate G7 is coupled to a pair of AND gates $G_B$, $G'_B$ buffered in parallel to apply an "initiate" signal to amplifier AB. Gate $G_B$ is enabled upon simultaneous application of a first "blanks-indicated" signal from gate G7 and the second request signal "$drs_2$." Gate $G'_B$ is adapted to be enabled upon application of the output from amplifier AB (enabled by GB) fed back thereto regeneratively and the second "blanks-indicated" signal (responsive to "$drs_2$") from gate G7. Amplifier AB is coupled to an AND gate G9 in conjunction with the output signal "pch" from interposer control system ICS. Gate G9 is coupled to enable a pair of AND gates GF, G'F, being applied through inverter $I_F$ to the latter. Gates G'F, GF are adapted to be enabled upon the conjunctive application of signal "ptp–d," a delayed form of signal "ptp," to cause reset and setting, respectively, of a following blank flip-flop $FF_B$. $FF_B$ may be set to emit the "blanks-indicated" signal (2b) and the negation thereof ($\overline{2b}$). Signal $\overline{2b}$ is applied to one leg of an AND gate $G_{12}$ in conjunction with signal "ptp–d," signal "pch" and signal "dsd" emanating from synchronizing unit DS–S. The output from gate $G_{12}$ is adapted to initiate a multivibrator O'/S to generate pulse "pm" for activation of the interposer coils i–c. Synchronizing means DS–S comprises preferably a plurality of flip-flop storage means and related inverter means which may take any suitable form known to those skilled in the art for accepting the indicated control signals and generating error checking and synchronizing signals in response thereto as indicated.

Data Request System DRS comprises a multivibrator O/S adapted to accept input pulses coupled thereto from either of a pair of AND gate means $G_4$, $G_5$ and in response thereto emit prescribed data request signals, for instance, generating two signals "$drs_1$," "$drs_2$" for the two-column punch mode, as indicated. Gate G4 is a "punch-synchronized" DRS gate and is adapted to be enabled by application of "no-blank" pulse $\overline{2b}$, punch synchronizing pulse "$ptp$," and punch command "$pp$" and to be inhibited by a second synchronizing pulse "$dsd$." Companion gate G5 is the "unsynchronized DRS gate" and is adapted to be enabled by application of "blanks-indicated" pulse ($2b$), by interposer-energizing pulse "$pch$" and by signal "$ptp$–B," a delayed form of the strobe pulse "$sp$," which is coupled through a multivibrator O"/S. While the above is believed to generally indicate the operation of the control unit DL and associated systems of the punching mechanism, this will become more apparent upon consideration of the following explanation, in conjunction with consideration of the timing diagram in FIGURE 12.

*Operation*

For understanding the operations indicated in timing diagram of FIGURE 12, the following assumptions will be made. It will be assumed that the mechanism is punching in a two-column mode, that the punch mechanism (bail 21, etc.) is relatively slow and must be synchronized within certain cases; that the punch mechanism and the CPU are operative and running; and that a "punch-a-card" signal "$pp$" and a "pinch" command "$pnh$" have been given.

Firstly: the "$pnh$" signal will command the pinch rollers (not shown) upstream of the punch station in FIGURE 1 to inject the next card to be punched and will also instruct the punch-transport unit 4 to eject any card already in the punch station by assuming its high-speed mode. To do this, "$pnh$" will set flip-flop FF1 to emit a "$cdm$" signal and set flip-flop FF3 to enable gate G2 for application of high-speed command "$cdh$" to motor control MC. The injected card will not be engaged by the motor by the punch transport 4 during this mode however.

Secondly: the injected card will uncover the alert detector means (detector GD or its equivalent) to emit an alert signal "$frs$" which, after delay at $D_1$, will reset flip-flop FF3 to disable gate G2 removing signal "$cdh$" and leaving signal "$cdm$" to reduce motor speed from high to low.

Thirdly: the card will continue moving at low speed and next uncover the first strobe slit in line ($S_1$) to indicate approach of the first punch position (for columns 1 and 2) via emission of an "$sp$" signal from strobe unit 6 to enable gate G3; there being "no blanks" indicated at this first punch position and signal $\overline{2b}$ thus being up. Gate G3 will then reset flip-flop FF1 to remove signal "$cdm$" and stop motor 41. As indicated above, motor 41 is arranged to be purely "field-controlled" (accelerated by magnetic field only) and will be brought to rest by the application of a reversing current to the rotor coils thereof until such time as the tachometer indicates zero velocity to the compare unit SCM.

Fourthly: The "get-in-punch synchronism" phase is now invoked. At first, the system must await the cycling of bail 21 until "home" position (BDC) comes up, at which point reluctance pick-up 5 will generate a $tpm$ signal, indicated as pulse AA. Signal "$tpm$" will then act to provide an interposer-enabling pulse "$pch$" throughout the remainder of the punching sequence. That is, as indicated in block ICS (in FIGURE 7) gate G10 may now be enabled by a modified version of signal "$tpm$" since punch command "$pp$" and delayed strobe signal "$sp$" have already occurred. Gate G10 is thus enabled to set flip-flop FF2 to generate pulse "$pch$." When punching is finished, the negation of punch command "$pp$," namely signal "$\overline{pp}$," will enable gate G11 to reset flip-flop FF2 as indicated.

Signal "$tpm$" is delayed (as indicated in FIGURE 7) by delay $D_A$ to generate pulse "$ptp$" whose leading and trailing edges, in turn, will enable multivibrator O/S to emit data request signals "$drs_1$," "$drs_2$" respectively being coupled thereto through gate G4. Gate G4 will be enabled by "$ptp$" since "punch" is indicated ($pp$), since "no blanks" is indicated ($\overline{2b}$) and since inhibit pulse "$dsd$" is not up.

Request signals "$drs_1$," "$drs_2$," will then cause the CPU to select the proper interposers for punching at position #1 and also to indicate at blank detecting block BB whether or not there is punching to be done in the next punching position. Note that the punch interposer activating pulse "$pm$" will have been initiated at gate $G_{12}$ by the application of signal $ptp$–$d$ to multivibrator O'/S.

It will be assumed that there is punching to be done at position #2 also and thus the $\overline{2b}$ output from section BB will remain up. It will be noted, however, that punching at position #1 cannot be effected until the next bottoming position of bail 21, i.e. at $BDC_2$. Therefore, an abnormal inhibit signal "$dsd'$" will be generated by synchronizing means DSS to inhibit the action of gate G8 from opening upon the arrival of the first "$atp$" signal (following pulse AA). Signal "$dsd'$" will persist for less than one cycle, thereafter being ineffective. Signal "$dsd'$" is operative to inhibit card advance gate G8 only where there has been no "prior punching operation."

Punch bail 21 now drives the punches 23A, 23B, etc. as selected, then a second echo check pulse "$tpm$" is derived (by pick-up 5) indicated at BB. Signal "$tpm$" can cause indication of punch-driving errors as desired. As before, "$tpm$" will generate signal "$ptp$" which, in turn, will generate data request signals "$drs_1$," "$drs_2$" to select the interposers for the second punch positions or alternatively to indicate to block BB that there are "blanks" there. It will be presumed that there is also punching to be performed at position #2 and hence, section BB will not indicate blanks, but signal $\overline{2b}$ will remain up and control unit DL will remain "punch-synchronized."

Next, the generation of signal "$atp$" (following pulse at BB) will open gate G8 setting flip-flop FF1 to emit signal "$cdm$" and causing the transport to advance the card in low speed until the arrival of the trailing card edge uncovers slit S2 causing the generation of strobe pulse $sp$–#2 indicating arrival of punch position #2. The application of pulse $sp$–#2 to gate G3 will act to reset flip-flop FF1 and decelerate transport motor 41 to stop the card at punching position #2. It will be noted that here no inhibit signal "$dsd'$" was applied to gate G8, there having been punching performed at the prior position.

The interposers having been selected for proper punching at position #2, the next bottoming (BDC–3) of bail 21 will cause the second punching action as indicated.

Fifthly: The next punch synchronizing signal "$tpm'''$" (at point CC) will be generated and, being delayed to form pulse, $ptp$ will cause the generation of data request signals for the third punching position, as indicated. At this point, it will be presumed that the data request signals inform block BB that "blanks" are indicated in the next position (position #3), that is, that there is no punching to be done there.

It may be noted that the CPU may thus indicate to gate G7 that there are "blanks" present so that gate $G_B$ may in turn be enabled to apply an initiating pulse to amplifier AB upon the arrival of the second data request signal "$drs_2$" thereat. Amplifier AB will generate a pulse which is coupled to gate G9 and also fed back to gate $G'_B$ which will be caused to apply a "hold-on" signal to amplifier $A_B$ upon the incidence of a second blank-indicating output (via "$drs_2$") applied by gate G7. Thus, amplifier AB will enable gate G9 to cause flip-flop $FF_B$ to emit a "blanks-indicated" pulse $2b$ upon the incidence of two successive "blanks-indicated" responses by CPU to data requests "$drs_1$," "$drs_2$." It will be evident that flip-flop $FF_B$ is adapted to be reset when amplifier AB stops energizing gate G9 since the output thereof will be transformed by inverter $I_F$ to enable gate $G'_F$.

It should be noted that the "blanks-indicated" signal $2b$ performs a number of functions: It prevents the energization of interposer coils $i$-$c$ by removing signal $\overline{2b}$ from gate $G_{12}$. It enables gate G1 for the later generation of a high-speed command. It disables gate G3 and gate G4 by removing pulse $\overline{2b}$. Thus, upon the incidence of a following strobe pulse $sp$, #3), flip-flop $FF_1$ will not be reset to stop the motor, but rather pulse "$sp$" may be used to enable alternative asynchronous DRS gate G5, (for "$drs$" pulses regarding position #4), synchronized DRS gate G4 having thus been disabled.

Sixthly: The incidence of the next "$atp$" signal (following CC) will have automatically initiated "high-speed skip" causing the transport 41 to assume a high-speed operation. That is, pulse "$atp$" will have enabled gate G8 to cause flip-flop FF1 to generate to generate pulse "$cdm$," which, when applied to gate G1 with $2b$, will cause the generation of high-speed pulse "$cdh$." The system is now out of punch synchronism and will operate asynchronously as follows:

Seventhly: The next following strobe pulse "$sp$-3" will occur and, as indicated above will not stop transport motor 41, but rather will be delayed at multivibrator O″/S causing the emission of pulse "$ptp$-B" to open gate G5, causing multivibrator O/S to emit data request signals for punch position #4. Here, it will be recognized, control block "DL" and strobe means "SPG" cooperate to "look-ahead," i.e. as one record zone passes through the punch station, the indicated operations (punching, advance mode, etc.) for the succeeding zone (or zones) are examined. In this mode, strobe pulse "$sp$-3" will also cause the generation of "pseudo echo-check signal" $tpm$-B.

It will be presumed that the response to this data request indicates "blanks" (at position #4) whereby block BB will maintain signal $2b$ at gate G1 to keep the transport in high-speed skip mode and the system asynchronous.

Eightly: Strobe signal $sp$-4 arrives (reflecting the uncovering of slit $S_7$ at the fourth punching position) and again $sp$-4 will not stop the transport motor 41, but rather cause the generation of a following set of data request signals for position #5. It will be assumed that the response to this request indicates that punching is to be performed at position #5 and thus block BB will then be reset, that is, the output from AB will disappear causing gate $G'_F$ to reset flip-flop FFB, thus removing pulse $2b$ and invoking its negation, $\overline{2b}$. Thus, gate G1 will then close removing high-speed command pulse "$cdh$" and causing the transport motor 41 to assume its low speed mode in response to signals "$cdm$," remaining applied by flip-flop FF1. At this point, it should be noted that another feature of the invention is that when the high-speed skip mode is invoked, the system may automatically "look-ahead" to optimize following transport control operations, for instance, causing the transport motor to shift from high to low speeds before a stopping control is applied, thus assuring a constant, reliable and accurate stopping control operation. Note that the system is still "out of punch synchronism" and thus the "$tpm$" signal following at point DD will be ignored.

Ninthly: The system will be resynchronized, i.e. returned to synchronism with bail 21. Thus, the next strobe pulse "$sp$-5" arrives, indicating to motor 41 that the punch position #5 has arrived and acting to stop the card, since punching is to be performed there. Thus, "$sp$-5" will open gate G3 to reset flip-flop FF1, removing signal "$cdm$" and thus providing a reversing field to motor 41 to stop it at punch position 5 exactly. At the next bottoming position of bail 21, (i.e. at BDC-5) a punch echo pulse "$tpm$" will be generated (at point EE) bringing the system back into "punch synchronism." When a "$tpm$" signal is derived at EE, the derivative "$ptp$" will be unable, for one cycle, to then cause G4 to initiate "$drs$" signals, gate G4 being temporarily inhibited by synchronizing pulse "$dsd$."

Note here that, as for punch position #1, an inhibit signal "$dsd'$" is provided by synchronizing section DS-S to prevent the "$atp$" signal following pulse EE from causing the advancement of the card and allowing it to await the following bail-bottoming position BDC-6. However, "$ptp$-$d$" may nonetheless enable gate $G_{12}$ to provide current interposer ($pm$) for punching at position #5.

Following the generation of the next "$ptp$" (after pulse FF), a data request (for position #6) will be made in response to which "no-blanks" will be indicated at block BB.

According to the invention, it will be understood that if one changes his punch mode, for example, to punch by a single column or by four columns, (rather than the indicated two-columns) he may change the response of block BB and change the number of DRS outputs provided by multivibrator O/S accordingly.

The above demonstrates that the invention provides a novel punch/transport control arrangement adapted to automatically advance a card from position-to-position with position-referenced control and also with a constant programmed stopping mode (i.e. to always decelerate from a certain low speed). The novel strobe means provides the desired position referencing and the novel control system logically combines the strobe and other signals, for instance, to synchronize with punch-actuation when a card enters the punch at high speed, and is "strobe-stopped." With the strobe, this control system may provide a "look-ahead" control capability. The control system may also, preferably, include a "High Speed Skip" capability, whereby blank-detecting means are provided to indicate "skip mode" to the rest of the system (e.g. to the speed select block) and with desynchronizing means provided to coordinate the transition to, and from, "skip mode"; for instance, delaying the operation of the Data Request block or of the Speed Select block one-punch cycle after return from "skip" for synchronizing with the punch. To accommodate this skip mode, the Data Request system is also made selectively punch-synchronous or not (i.e. strobe responsive).

It will be apparent to those skilled in the art that equivalent means may be used within the spirit and scope of the inventive teaching. That is, while the invention has been particularly shown and described with reference to the preferred embodiment thereof above, it will be understood by those skilled in the art that changes in form and details, in materials and dimensions and the like may be made, certain features being substituted for on deleted without departing from the spirit or scope of the invention.

What is claimed is:

1. In a record processing system for advancing record media along a prescribed path past a processing station and operating upon said media with continuous reference to the position thereof, said processing station including indicia impressing means for selectively applying indicia impressions to said media in accordance with the position thereof; timing means adapted to generate timing signals indicating the phase of said impressing means and indicia indicating means for generating indicating signals for controlling said impressing means to apply prescribed indicia pattern to said media at prescribed locations thereon, the combination therewith comprising:

record tracking means disposed along said path in prescribed relation with said station and adapted to develop strobe signals directly indicating prescribed incremental positions of said media relative thereto; strobe-responsive record transport means arranged to advance said media along said path in a prescribed manner as indicated by said strobe signals, said transport means including record engaging means and field-accelerated, low-inertia drive means having the rotatable portion thereof coupled directly to said engaging means; and strobe-responsive control means electrically connected between said tracking means, said indicating means, said impressing means, said timing means, and said drive means, and adapted to logically combine said strobe, timing and indicating signals to responsively generate and apply speed-control signals to said drive means and impression-control signals to said impressing means for controlling the operations thereof; said control means comprising data request means connected and arranged to interrogate said indicating means to initiate said indicating signals, speed determination means adapted to apply prescribed velocity signals to control said drive means at prescribed speeds in response to said speed control signals and to prescribed patterns of said indicating signals; said determination means being arranged to apply said signals according to a prescribed order so that said drive means is stopped from a constant low velocity.

2. The combination recited in claim 1 wherein said drive means comprises a field controlled low-inertia motor arrangement adapted to be quickly and uniformly responsive to said velocity signals for acceleration to a constant velocity as indicated thereby and for field-reversing deceleration upon the removal thereof; wherein said determination means includes speed select means arranged to apply said signals to said drive means; and blank-detecting means connected to be responsive to sequential groups of processing signals from said indicating means and, in response to the "no-operation" condition of all signals in an indicia group, to generate "blank signals," applying them to said speed select means for controlling the output thereof; wherein said control means is arranged to be selectively synchronous with said timing signals or asynchronous therewith, and responsive to said strobe signals, said selectivity being invokable at any time or number of times within a process cycle; and is adapted to generate a plurality of speed control signals according to the condition of said blank signals and; wherein said motor arrangement is adapted to assume a different prescribed velocity in response to each of said speed control signals and corresponding velocity signals.

3. The combination recited in claim 2 wherein said blank detecting means is arranged to provide said "blank" signals only upon occurrence of successive "no-operation" sets of signals in said indicia group associated with a prescribed processing position, being automatically controlled to be enabled regeneratively in response to the last in order of said sets in a position-group and to be automatically disabled upon the disappearance of said "no-operation" sets of signals.

4. The combination recited in claim 3 wherein said impressing means comprises a punch means arranged to selectably drive ones of an array of punch knives through punched record media at prescribed locations thereon, said punch means including continuously rotating punch thrust means and associated timing means adapted to generate punch-timing signals; wherein said indicating means includes computer means adapted to generate punch-indicating signals in a prescribed order; and wherein said control means includes punch control means adapted to logically combine said punch-indicating signals, said punch-timing signals and said strobe signals to generate responsive punch-control signals and speed control signals; said punch control means being adapted to generate a plurality of different speed control signals according to the condition of said punch-indicating signals and also being arranged to be selectively responsive, either in synchronism with said punch timing signals, or, asynchronous thereof, responsive to said strobe signals, at any time, or number of times, within a process cycle, said asynchronous response being adapted to initiate said request means to interrogate said computer means for anticipatory punch-indicating signals.

5. The combination recited in claim 1 wherein said control means also includes synchronizer means connected to said determination means and arranged to control said request means and said determination means for suppressing the operations thereof at prescribed times.

6. The combination recited in claim 5 wherein said data request means is coupled to said timing means so as to be selectively initiable in synchronism therewith responsive to said timing signals and is also arranged to be selectively asynchronous thereof, being initiable responsive to said strobe signals instead.

7. The combination recited in claim 6 wherein said determination means includes blank-detecting means adapted to generate blank signals, being coupled to said timing means and adapted to be automatically reset responsive to said timing signals; and wherein said synchronizer means is coupled to be responsive to said blank signals, said timing signals and said strobe signals so as to responsively suppress certain operations of said data request means and of said speed select means at precribed times during transition to punch synchronism.

8. The combination recited in claim 7 wherein said impressing means comprises a relatively slow, synchronously-operating punch means including a plurality of punches, punch interposer means associated with each punch and associated interposer-select means including actuator means and associated energizing means adapted to selectively energize said actuator means; said energizing means being coupled to be responsive to said indicating means, to said strobe signals, to said timing signals, to said blank-detecting means and to said synchronizing means and adapted to apply energizing current to said actuator means at prescribed times in synchronism with said timing signals, being suppressed during said transition times.

9. The combination recited in claim 5 wherein there is included a strobe-alert detector means associated with said tracking means for initiation thereof in response to alert signals generated thereby; and wherein said determination means is coupled to said computer means for generation of high speed advance signals responsive to "record-injection" signals therefrom and is also coupled to said alert-detector means, being adapted to modify said high speed signals in response to said alert signals thereof, thus providing a two-speed injection/transport mode.

10. In a data processing system employing unit record media and including computer means, a punching station and associated record advancing means for translating said records along a prescribed path through said station in prescribed alignment at prescribed times and speeds, said advancing means including field-decelerated motor means, the combination therewith of improved position-responsive control means comprising:

strobe means including detector means arranged in prescribed spaced relation with said station to provide strobe signals indicating prescribed record positions along said path; alert detector means disposed upstream of said detector means to generate alert signals indicating the approach of said records, and electronic ordering means arranged to be initiated by said alert signals and to responsively gate out said strobe signals in prescribed sequence; motor control means adapted to apply a plurality of speed signals to said motor means for effecting advancement of said records at prescribed speeds; and process control means coupled between said punching station, said motor control means, said alert detector means, said computer means and said strobe means and arranged to apply speed-regulating signals to said motor control means at prescribed record positions indicated by prescribed ones of said strobe signals, saaid process control means including data request means connected and arranged to interrogate said computer means to generate punch-indicating signals and blank-signals and detect-select means connected and arranged to, responsive to said signals, apply a plurality of speed control signals to said motor control means to initiate prescribed ones of said speed signals therefrom.

11. The combination as recited in claim 10 wherein said advancing means comprises electrically-decelerated record transport means including record engaging means and controllably torque-variable motor means directly coupled to said engaging means so as to translate records at selectable ones of said prescribed speeds; wherein said process control means is adapted to control said transport means to deliver prescribed record speeds according to data signals presented thereto; wherein said strobe means is located along said path for automatically sensing the advancement of terminal portions of said media, said terminal portions indicating gaps between record fields and being thereby capable of locating record zones relative to said station, said strobe means including a plurality of radiation detecting transducer means aligned along said path upstream of said station and arranged to incrementally sense the advancement of said terminal portions at predetermined intervals to responsively apply presence-signals to said process control means; wherein said alert detector means is arranged to initially detect the passage of said terminal portions and responsively apply "alert" signals to enable said strobe transducers; wherein said ordering means comprises commutating means adapted to combine said "alert" and "presence" signals to generate strobe signals and to apply said strobe signals to said process control means as part of said data signals; and wherein said select means is adapted to apply said speed control signals in prescribed hierarchical sequence so as to stop said motor means from a constant prescribed velocity, said select means being coupled to decelerate said motor means in response to said alert signals and to said strobe signals at prescribed times and to accelerate said motor means in response to said blank signals.

12. The combination recited in claim 11 wherein said select means includes blank-detecting means connected to be responsive to sequential groups of processing signals from said computer means, and in response to the "no-operation" condition of all signals in an indicia group, to generate a "blanks-indicated" signal, applying it to said select means for controlling the output thereof.

13. The combination as recited in claim 12 wherein said punching station includes punch-select means and wherein said blank-detecting means comprises a bistable signal generating means adapted to be set to generate said "blanks-indicated" signals and to be reset to generate the negation thereof whereby to control the outputs of said motor-control means and of said data request means, and also comprises blank-indicating means connected to set said generating means and including input gate means adapted to generate successive sets of blank signals in a group, a plurality of gate channels, one for each set, connected to respond to said blank signals to generate "all-blank" signals and output gate means buffered to be enabled by said channels and by said punch-select means.

14. The combination recited in claim 12 wherein said control means also includes synchronizer means connected to said blank-detecting means and arranged to control said request means and said select means for suppressing the operations thereof at prescribed times.

15. The combination recited in claim 14 wherein said impressing means comprises a relatively slow, synchronously-operating thrust means and associated timing means, a plurality of punches, punch interposer means associated with each punch for engaging the punch to be driven by said thrust means plus associated interposer-select means including activator means and associated energizing means adapted to selectively energize said actuator means, said energizing means being coupled to operate responsive to said computer means, to said strobe signals, to said timing means, to said blank-detecting means and to said synchronizer means and adapted to apply energizing current to said actuator means at prescribed times synchronized with said timing means, being suppressed at atypical processing times.

16. A paired-column card punch system comprising in combination:
a plurality of card punches and associated punch selecting means; continuously-rotating punch driving means adapted to drive said punch as when selectively engaged therewith by said selecting means, said punch driving means including timing means adapted to generate a "timing signal"; card translation means including card engaging means and transport drive means directly connected to said engaging means to rotate the same at prescribed speeds in sole response to prescribed speed-control signals; position tracking means arranged to generate strobe signals indicating prescribed punch positions assumed by card records as they are translated relative to said punches; computer means; and punch control means coupled to receive said timing signals and said strobe signals and to responsively generate and apply punch control signals to said punch selecting means and speed control signals to said drive means, corresponding to prescribed record velocities imparted by said drive means, said punch control means including synchronizing means for automatically synchronizing said signals with said timing signals and automatically desynchronizing therewith; data request means coupled to said timing means and said tracking means to be selectively, alternately initiable thereby to interrogate said computer means and detect-select means coupled to said computer means, said synchronizing means and said tracking means to generate and apply said speed control signals at prescribed times to said drive means causing the same to operate at prescribed speeds related to punch-selection patterns and to be controllably decelerated therefrom in step-fashion for stopping card translation.

17. The combination as recited in claim 16 wherein said translation means includes a multi-speed, low inertia, field-decelerable motor adapted to translate said records at prescribed speeds in direct response to prescribed speed-control signals from said control means; wherein said punch means includes two sets of punch selectors, two sets of punches operatively associated with said selectors, continuously, synchronously-rotating punch bail means including responsive timing means for generating said timing signals to indicate a prescribed cyclic state thereof; wherein said computer means is adapted to indicate prescribed conditions of said selectors relative prescribed column-positions of associated records, said computer means being adapted to apply blank-indicating signals to said detect-select means in response to request signals from said request means and wherein said punch control means is adapted to automatically generate said speed-control signals and said request signals in response to prescribed patterns of received strobe signals, timing signals and blank-indicating signals, being automatically desynchronizable so as to selectively respond to said strobe signals or to said timing signals.

18. In a unit record processing apparatus, computer processor means, roller means for advancing unit records past a processing station, drive means including rotor and stator means arranged to activate said roller means at prescribed times, said rotor means being coupled directly to said roller means for field-controlled acceleration and deceleration thereof; a process control circuit coupled to controllably activate said drive means; and record strobing means disposed in prescribed relation upstream of said processing station and adapted to present strobe signals to said control circuit, said control circuit being adapted to control the speed of said drive means responsive to said strobe signals and comprising speed-select means coupled to control said drive means in response to signals from said processor means at speeds related to processing patterns, said processing station and said strobing means; and also comprising request means connected and adapted to selectively interrogate said processor means in synchronism with said processing station or asynchronously thereof, responsive to said strobe signals.

References Cited

UNITED STATES PATENTS

| | | | |
|---|---|---|---|
| 3,002,677 | 10/1961 | Haney et al. | 234—128 |
| 3,027,068 | 3/1962 | Rinzo Iwai et al. | 234—126 |
| 3,093,303 | 6/1963 | Dirks | 234—129 |
| 3,191,857 | 6/1965 | Galey et al. | 234—128 |

WILLIAM W. DYER, Jr., *Primary Examiner.*

GERALD A. DOST, *Examiner.*